United States Patent
Nakano et al.

(10) Patent No.: US 9,929,605 B2
(45) Date of Patent: Mar. 27, 2018

(54) WIRELESS POWER TRANSFER DEVICE WITH FOREIGN OBJECT DETECTION, SYSTEM, AND METHOD FOR PERFORMING THE SAME

(71) Applicant: Sony Corporation, Tokyo (JP)

(72) Inventors: Hiroaki Nakano, Tokyo (JP); Osamu Kozakai, Kanagawa (JP); Shinji Komiyama, Saitama (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/088,082

(22) Filed: Mar. 31, 2016

(65) Prior Publication Data

US 2016/0218567 A1    Jul. 28, 2016

Related U.S. Application Data

(63) Continuation of application No. 14/408,082, filed as application No. PCT/JP2013/003724 on Jun. 13, 2013, now Pat. No. 9,712,001.

(30) Foreign Application Priority Data

Jun. 22, 2012    (JP) ................. 2012-141203

(51) Int. Cl.
   *H02J 50/60*    (2016.01)
   *B60L 11/18*    (2006.01)
   (Continued)

(52) U.S. Cl.
   CPC ............. *H02J 50/60* (2016.02); *B60L 11/182* (2013.01); *B60L 11/1833* (2013.01);
   (Continued)

(58) Field of Classification Search
   None
   See application file for complete search history.

(56) References Cited

U.S. PATENT DOCUMENTS

| 8,368,359 B2 | 2/2013 | Chen |
| 2007/0228833 A1* | 10/2007 | Stevens ................... H02J 5/005 307/45 |

(Continued)

FOREIGN PATENT DOCUMENTS

| DE | 102009033236 A1 | 1/2011 |
| JP | 2001-275280 A | 10/2001 |

(Continued)

OTHER PUBLICATIONS

Japanese Office Action dated Feb. 21, 2017 for corresponding Japanese Application No. 2016-078107.

(Continued)

*Primary Examiner* — Rexford Barnie
*Assistant Examiner* — David Shiao
(74) *Attorney, Agent, or Firm* — Michael Best & Friedrich LLP

(57) ABSTRACT

Methods and apparatus for detecting the presence of undesirable foreign matter in a region between a wireless power transmission apparatus and a power reception apparatus are described. First and second detection methods, based on different detection schemes, may be used to detect and distinguish the presence of foreign matter from misalignment during power transfer operation method may be used while power is supplied to the load.

25 Claims, 17 Drawing Sheets

(51) Int. Cl.
*H01F 38/14* (2006.01)
*H02J 5/00* (2016.01)
*H02J 50/12* (2016.01)
*H04B 5/00* (2006.01)

(52) U.S. Cl.
CPC ....... *B60L 11/1846* (2013.01); *B60L 11/1848* (2013.01); *H01F 38/14* (2013.01); *H02J 5/005* (2013.01); *H02J 50/12* (2016.02); *H04B 5/005* (2013.01); *H04B 5/0037* (2013.01); *B60L 2210/10* (2013.01); *B60L 2210/30* (2013.01); *B60L 2210/40* (2013.01); *B60L 2240/36* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2008/0200119 A1 | 8/2008 | Onishi et al. |
| 2009/0021219 A1 | 1/2009 | Yoda |
| 2009/0133942 A1* | 5/2009 | Iisaka ............... H02J 7/025 178/43 |
| 2009/0322280 A1 | 12/2009 | Kamijo |
| 2009/0322281 A1 | 12/2009 | Kamijo |
| 2010/0013322 A1 | 1/2010 | Sogabe |
| 2011/0074346 A1 | 3/2011 | Hall |
| 2011/0196544 A1* | 8/2011 | Baarman ............ H01F 38/14 700/291 |
| 2011/0270462 A1* | 11/2011 | Amano ............... H02J 5/005 700/297 |
| 2012/0001493 A1 | 1/2012 | Kudo |
| 2012/0091993 A1 | 4/2012 | Uramoto |
| 2012/0119576 A1* | 5/2012 | Kesler ............... B60L 11/182 307/10.1 |
| 2012/0175967 A1 | 7/2012 | Dibben |
| 2012/0242285 A1* | 9/2012 | Jung ............... H02J 7/0029 320/108 |
| 2012/0326521 A1* | 12/2012 | Bauer ............... H02J 5/005 307/104 |
| 2012/0326662 A1 | 12/2012 | Matsumoto |
| 2013/0027078 A1* | 1/2013 | Nakano ............. H02J 5/005 324/764.01 |
| 2013/0063085 A1 | 3/2013 | Takada |
| 2013/0076153 A1 | 3/2013 | Murayama |
| 2013/0094598 A1 | 4/2013 | Bastami |
| 2014/0015522 A1 | 1/2014 | Widmer |
| 2015/0035376 A1 | 2/2015 | Baarman |

FOREIGN PATENT DOCUMENTS

| | | |
|---|---|---|
| JP | 2004-208383 A | 7/2004 |
| JP | 2009-124889 A | 6/2009 |
| JP | 2009-273260 A | 11/2009 |
| JP | 2010-119246 A | 5/2010 |
| JP | 2012-016171 A | 1/2012 |
| JP | 2012-065477 A | 3/2012 |
| WO | WO-2009/081115 A1 | 7/2009 |
| WO | WO-2011/084936 A2 | 7/2011 |
| WO | WO-2012/004092 A2 | 1/2012 |

OTHER PUBLICATIONS

Japanese Office Action dated Jan. 10, 2017 in corresponding Japanese Application No. 2016-078107.
Chinese Office Action dated Nov. 1, 2017 for corresponding Chinese Application No. 2016103993180.
European Patent Office Communication Pursuant to Article 94(3) EPC dated Feb. 2, 2018 for European Application No. 13 734 520.3.

* cited by examiner

FIG. 3

| POSITION | | L1 [μH] | | k | Q1 | Q2 | S | INTER-COIL EFFICIENCY [%] |
|---|---|---|---|---|---|---|---|---|
| X | Y | L2_open | L2_short | | | | | |
| 0 | 0 | 0.520 | 0.471 | 0.308 | 65.2 | 69.3 | 20.7 | 90.8 |
| 5 | 5 | 0.537 | 0.495 | 0.281 | 66.4 | 69.3 | 19.1 | 90.0 |
| 10 | 10 | 0.553 | 0.533 | 0.188 | 66.3 | 69.3 | 12.8 | 85.5 |
| 15 | 15 | 0.564 | 0.562 | 0.062 | 66.5 | 69.3 | 4.2 | 62.7 |
| 20 | 20 | 0.577 | 0.576 | 0.051 | 69.7 | 69.3 | 3.5 | 57.3 |

FIG. 11

| ITEM | UNIT | EFFICIENCY-BASED FOREIGN MATTER DETECTION METHOD ALONE | NEW DETECTION METHOD |
|---|---|---|---|
| MAXIMUM EFFICIENCY VALUE | % | 90 | 90 |
| POSITIONAL-RELATIONSHIP VARIATION WIDTH | % | 30 | 30 |
| MANUFACTURING VARIATION WIDTH | % | 15 | 15 |
| MEASUREMENT VARIATION WIDTH | % | 5 | 5 |
| WORST VALUE (WORST THRESHOLD) | % | MAXIMUM EFFICIENCY VALUE × 0.5 | MAXIMUM EFFICIENCY VALUE × 0.5 |
| EFFICIENCY VALUE IN ACTUAL USAGE SITUATION | % | UNKNOWN | IMMEDIATE EFFICIENCY (E.G., 80) |
| THRESHOLD (APPROPRIATE THRESHOLD) | % | MAXIMUM EFFICIENCY VALUE × 0.5 (90 × 0.5 = 45) | IMMEDIATE EFFICIENCY × 0.9 = 72 |

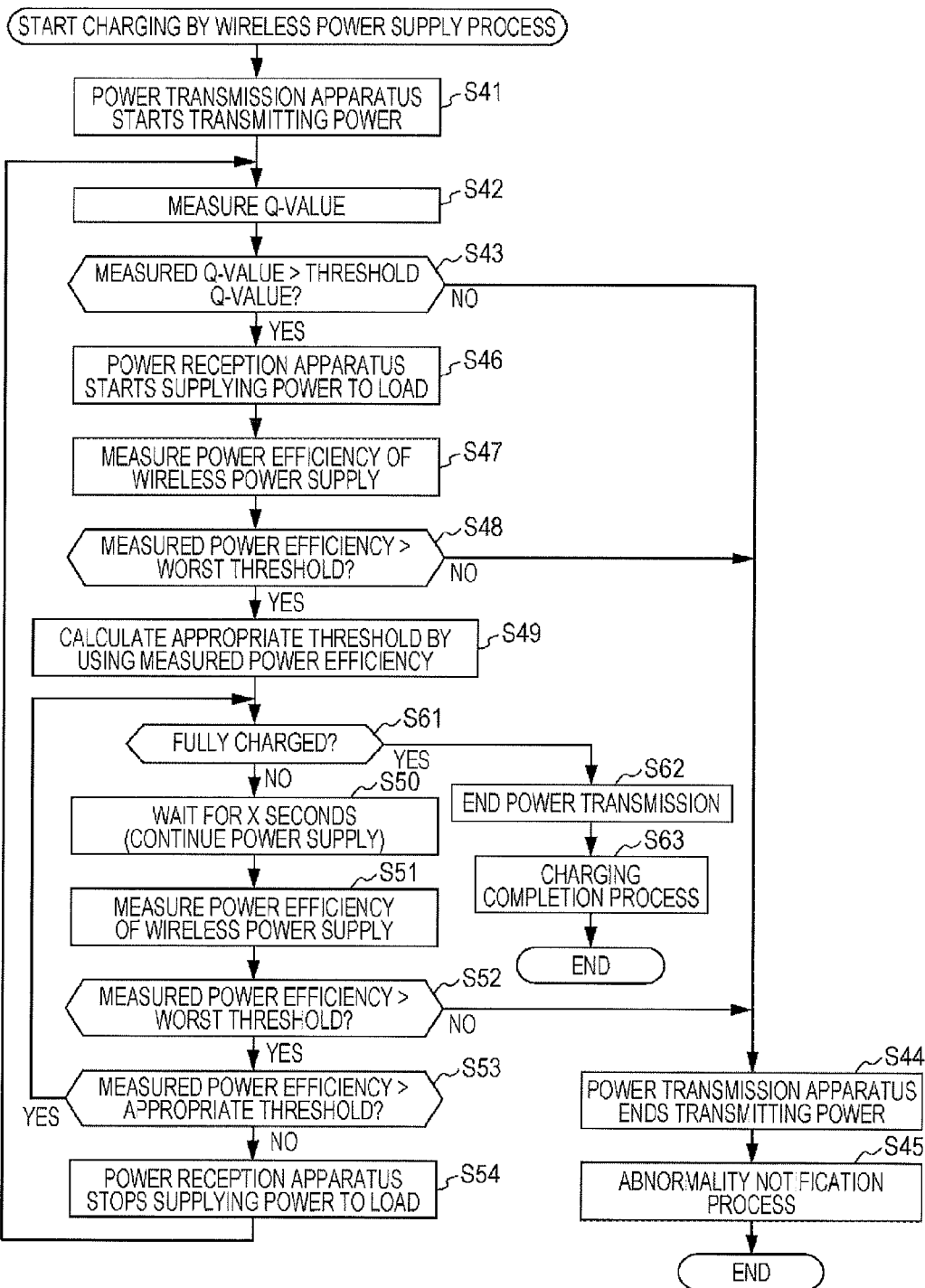

WIRELESS POWER TRANSFER DEVICE WITH FOREIGN OBJECT DETECTION, SYSTEM, AND METHOD FOR PERFORMING THE SAME

CROSS REFERENCES TO RELATED APPLICATIONS

This is a Continuation Application of the patent application Ser. No. 14/408,082, filed Dec. 15, 2014, which claims priority from National Stage Application No.: PCT/JP2013/003724, filed Jun. 13, 2013 and Japanese Patent Application No.: 2012-141203, filed Jun. 22, 2012, the entire contents of which being incorporated herein by reference.

TECHNICAL FIELD

The present technology relates to processing devices, processing methods, and programs, and particularly to a processing device, a processing method, and a program that enable efficient wireless power supply.

BACKGROUND ART

In recent years, wireless power supply for wirelessly supplying power has been actively studied. As methods for wireless power supply, methods using a magnetic field are available. The methods using a magnetic field are roughly classified into electromagnetic induction methods and magnetic-field resonance methods.

Electromagnetic induction methods are already being widely used. In the methods, the degree of coupling between a power transmission apparatus which transmits power and a power reception apparatus which receives power is very high, and power can be supplied highly efficiently.

Magnetic-field resonance methods are methods in which a resonance phenomenon is actively used, and are characterized in that the number of lines of magnetic induction shared by a power transmission apparatus and a power reception apparatus may be small.

Both of electromagnetic induction and magnetic-field resonance are methods for supplying power by using a magnetic field. Thus, the power transmission apparatus includes a power transmission coil, which is a coil for transmitting power by using a magnetic field, and the power reception apparatus includes a power reception coil, which is a coil for receiving power by using a magnetic field.

With the magnetic coupling between the power transmission coil and the power reception coil, power is supplied from the power transmission apparatus to the power reception apparatus.

If foreign matter capable of receiving energy from a magnetic field, such as metal, is between the power transmission coil and the power reception coil which are magnetically coupled to each other, an eddy current flows through the foreign matter and thereby heat is generated. Accordingly, energy is consumed and power supply efficiency decreases.

Under such circumstances, various methods for detecting foreign matter existing between a power transmission apparatus and a power reception apparatus have been suggested.

For example, PTL 1 describes the following technology. The current on a power transmission apparatus side is monitored, and, if the current is an eddy current, it is determined that foreign matter has been detected, and transmission of power from the power transmission apparatus is stopped.

CITATION LIST

Patent Literature

PTL 1: Japanese Unexamined Patent Application Publication No. 2001-275280

SUMMARY OF INVENTION

It is desirable to efficiently perform wireless power supply.

A processing device or a program according to an embodiment of the present technology may be a processing device including a detector configured to detect foreign matter by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and by determining whether or not foreign matter exists by using a second detection method, which is different from the first detection method, while power is being supplied to the load, or a program causing a computer to function as the processing device.

A processing method according to an embodiment of the present technology is a processing method including detecting foreign matter by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and by determining whether or not foreign matter exists by using a second detection method, which is different from the first detection method, while power is being supplied to the load.

According to an embodiment of the present technology, foreign matter may be detected by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and by determining whether or not foreign matter exists by using a second detection method, which is different from the first detection method, while power is being supplied to the load.

The processing device may be an independent device, or may be an internal block constituting a single device.

The program may be provided by being transmitted via a transmission medium or being recorded on a recording medium.

According to an embodiment of the present technology, wireless power supply can be efficiently performed.

In some embodiments, a method for controlling power supplied to a load of a wireless power reception apparatus comprises acts of receiving, wirelessly at a power reception coil of the power reception apparatus, power from a power transmission apparatus, and determining, by the power reception apparatus and according to a first detection method, whether foreign matter that adversely affects wireless power transmission is present between the wireless power transmission apparatus and the power reception apparatus. The act of determining may be executed before applying power from the power reception coil to the load. The method may further include analyzing, by the power reception apparatus according to a second detection method different from the first detection method and while power is applied to the load, power transmission between the wireless power transmission apparatus and the power reception apparatus.

In some aspects of a method for controlling power supplied to a load of a wireless power reception apparatus, the determining comprises measuring, by the power reception apparatus, a Q value of the power reception coil. In some variations of the method, the determining may comprise measuring, by the power reception apparatus, an effective resistance value of the power reception coil. In some embodiments, the determining comprises receiving or not receiving, by the power reception apparatus, an optical communication from the power transmission apparatus. In some implementations, the determining may comprise processing, by the power reception apparatus, an image of a region between the power transmission apparatus and the power reception apparatus.

According to some embodiments of a method for controlling power supplied to a load of a wireless power reception apparatus, the analyzing may comprise acts of receiving, by the power reception apparatus, an indication of an amount of power transmitted by the power transmission apparatus, and calculating, by the power reception apparatus, a ratio of power received by the power reception apparatus to the amount of power transmitted by the power transmission apparatus. In some implementations, the analyzing comprises measuring, by the power reception apparatus, a temperature near the power reception coil.

In some embodiments, a method for controlling power supplied to a load of a wireless power reception apparatus may further comprise transmitting, by the power reception apparatus and responsive to determining foreign matter that adversely affects wireless power transmission is present, a stop signal to the power transmission apparatus to indicate stopping the wireless power transmission. In some aspects, the method may further comprise providing a notification to a user of the power reception apparatus that an abnormal power transmission condition is present.

Embodiments are also directed to a power reception apparatus configured to receive power wirelessly from a power transmission apparatus. The power reception apparatus may comprise a power reception coil, a load, a controller configured to control power supplied from the power reception coil to the load, and a foreign matter detector. The power reception apparatus may be configured to determine, prior to applying power from the power reception coil to the load and according to a first detection method, whether foreign matter that adversely affects wireless power transmission is present between the power transmission apparatus and the power reception apparatus. The power reception apparatus may be further configured to analyze, according to a second detection method different from the first detection method and while power is applied to the load, power transmission between the wireless power transmission apparatus and the power reception apparatus.

In some embodiments, the power reception apparatus is arranged to supply power used to operate an electric vehicle.

In some implementations, the power reception apparatus is arranged to supply power used to operate a home electronic appliance or a mobile phone.

According to some aspects of the power reception apparatus, the configuration to determine whether foreign matter that adversely affects wireless power transmission is present comprises a configuration to measure, by the power reception apparatus, a Q value of the power reception coil.

Additionally, the configuration to analyze power transmission may comprise a configuration to receive, by the power reception apparatus, an indication of an amount of power transmitted by the power transmission apparatus, and calculate, by the power reception apparatus, a ratio of power received by the power reception apparatus to the amount of power transmitted by the power transmission apparatus.

According to some implementations of the power reception apparatus, the configuration to determine comprises a configuration to measure, by the power reception apparatus, an effective resistance value of the power reception coil.

In some embodiments, the configuration to analyze comprises a configuration to measure, by the power reception apparatus, a temperature near the power reception coil.

In some implementations, the power reception apparatus may further comprise a resistor configured to be switched across two terminals of the power reception coil so as to transmit a signal to the power transmission device.

Embodiments further include at least one manufactured storage device having machine-readable instructions that, when executed by at least one processor that is configured to control power supplied from a power reception coil to a load in a power reception apparatus, cause the at least one processor to execute acts related to power management. According to the machine-readable instructions, the at least one processor may determine, according to a first detection method and before applying power from the power reception coil to the load, whether foreign matter that adversely affects wireless power transmission is present between a wireless power transmission apparatus and the power reception apparatus. The processor may further analyze, according to a second detection method different from the first detection method and while power is applied to the load, power transmission between the wireless power transmission apparatus and the power reception apparatus.

In some implementations, the machine-readable instructions that cause the at least one processor to determine whether foreign matter that adversely affects wireless power transmission is present may comprise instructions to measure a Q value of the reception coil.

According to some embodiments, the machine-readable instructions that cause the at least one processor to determine whether foreign matter that adversely affects wireless power transmission is present may comprise instructions that cause the at least one processor to measure an effective resistance of the reception coil.

In some implementations, the machine-readable instructions that cause the at least one processor to analyze power transmission may comprise instructions for determining a ratio of an amount of power received by the power reception apparatus to power transmitted by the power transmission apparatus.

BRIEF DESCRIPTION OF DRAWINGS

FIG. 3 is a diagram illustrating the relationship between positional relationships between a power transmission coil and a power reception coil (displacement of the power reception coil) and power efficiency (inter-coil efficiency).

FIG. 11 is a diagram describing calculation of an appropriate threshold.

FIG. 12 is a flowchart describing a process of performing charging by using wireless power supply in the wireless power supply system.

DESCRIPTION OF EMBODIMENTS

Various types of apparatuses (objects) that consume power can be a power reception apparatus, for example, mobile terminals, home electronic appliances that are installed in a fixed manner, such as television receivers and refrigerators, and electric vehicles.

The power reception apparatus is not necessarily manufactured in view of wireless power supply, and thus a certain amount of metal, which is foreign matter for wireless power supply, may be used for the casing of the power reception apparatus or components inside the casing.

In a case where metal, which is foreign matter for wireless power supply, is used in (a part of) the casing of the power reception apparatus, if it is determined whether or not the current on the power transmission apparatus side is an eddy current, the metal contained in the casing of the power reception apparatus is detected as foreign matter even if no foreign matter exists between the power transmission apparatus and the power reception apparatus, and power transmission from the power transmission apparatus may be stopped.

If power transmission from the power transmission apparatus is stopped though there is no foreign matter between the power transmission apparatus and the power reception apparatus, power supply efficiency decreases.

It is desirable to efficiently perform wireless power supply.

I. Wireless Power Supply System According to an Embodiment of the Present Technology FIG. 1 is a block diagram illustrating an example configuration of a wireless power supply system according to an embodiment of the present technology.

Figure 1:
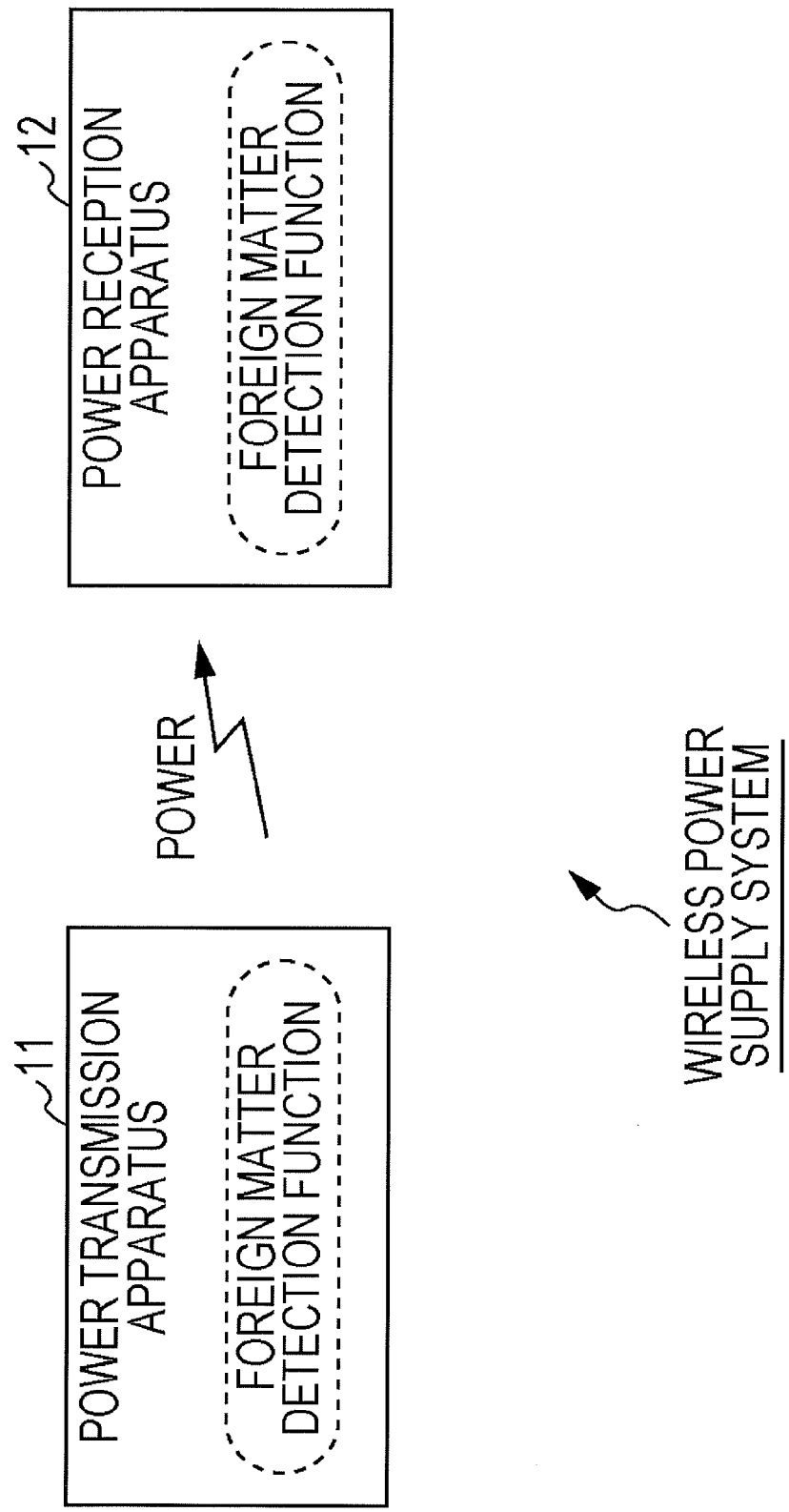
FIG. 1 is a block diagram illustrating an example configuration of a wireless power supply system according to an embodiment of the present technology.

Referring to FIG. 1, the wireless power supply system includes a power transmission apparatus 11 and a power reception apparatus 12, and performs wireless power supply using, for example, a method using a magnetic field, such as an electromagnetic induction method or a magnetic-field resonance method.

The power transmission apparatus 11 includes a power transmission coil, which is a coil for transmitting power using a magnetic field, and transmits power.

The power reception apparatus 12 includes a power reception coil, which is a coil for receiving power using a magnetic field, and receives power transmitted from the power transmission apparatus 11 when being placed near the power transmission apparatus 11.

The power transmission apparatus 11 and the power reception apparatus 12 have a foreign matter detection function of detecting foreign matter which affects wireless power supply.

Note that, regarding the foreign matter detection function, one of the power transmission apparatus 11 and the power reception apparatus 12 may have the whole foreign matter detection function, or both of the power transmission apparatus 11 and the power reception apparatus 12 may share the foreign matter detection function.

Examples of a system to which the wireless power supply system illustrated in FIG. 1 is applied are as follows: a set of a cradle serving as the power transmission apparatus 11 and a mobile terminal such as a mobile phone serving as the power reception apparatus 12, a set of a charging stand serving as the power transmission apparatus 11 and an electric vehicle serving as the power reception apparatus 12, and a set of a television rack serving as the power transmission apparatus 11 and a television receiver serving as the power reception apparatus 12.

In FIG. 1, only one power reception apparatus 12 is illustrated as a power reception apparatus which receives power from one power transmission apparatus 11 through wireless power supply. Alternatively, there may be provided a plurality of power reception apparatuses which receive power through wireless power supply.

With a wireless power supply system including a plurality of power reception apparatuses, the plurality of power reception apparatuses, such as mobile terminals, can be simultaneously charged by setting them on, for example, a tray (charging tray) serving as the power transmission apparatus 11.

II. Foreign Matter Detection Method

Figure 2:
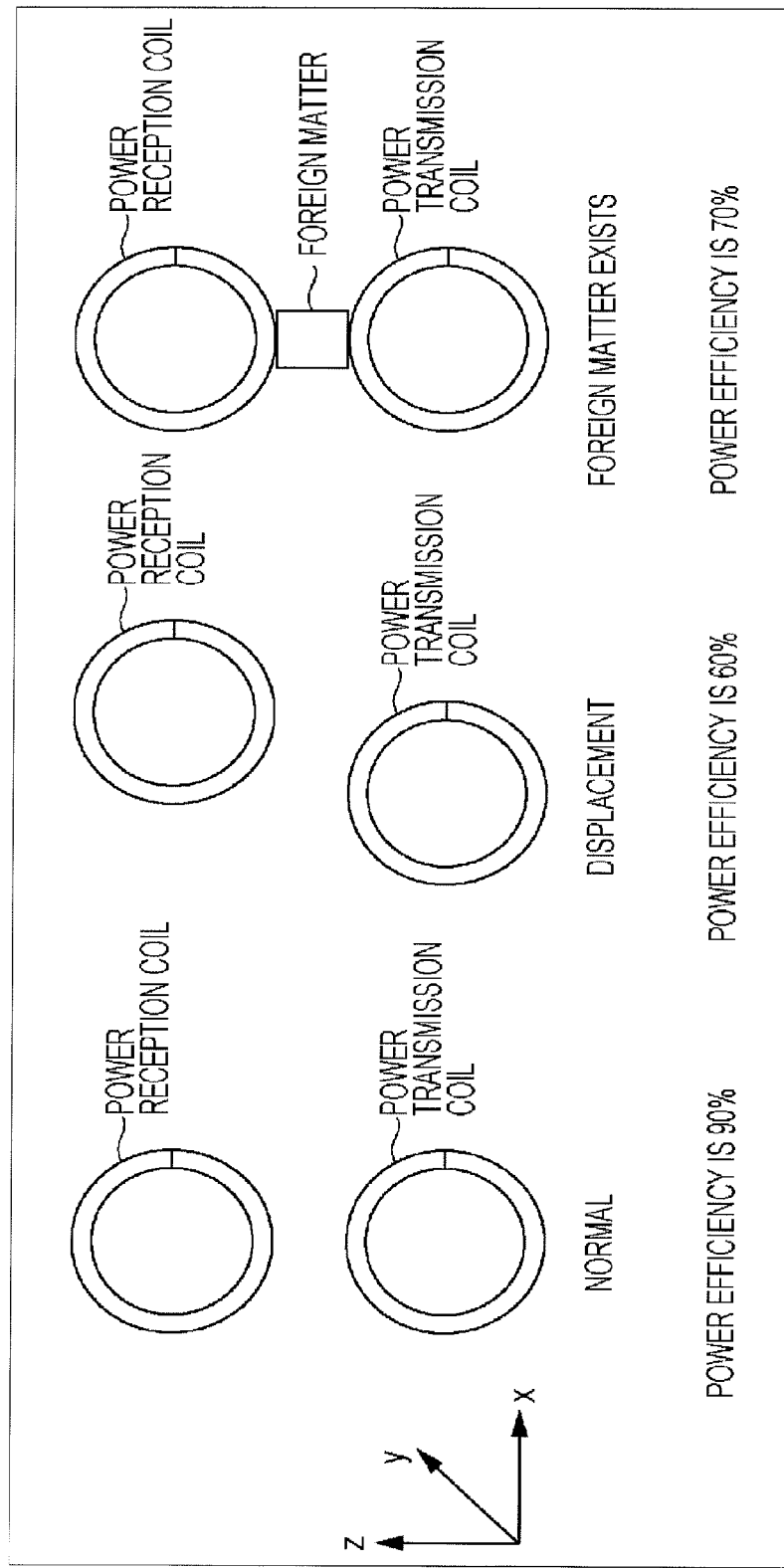
FIG. 2 is a diagram describing an efficiency-based foreign matter detection method.
Figure 4:
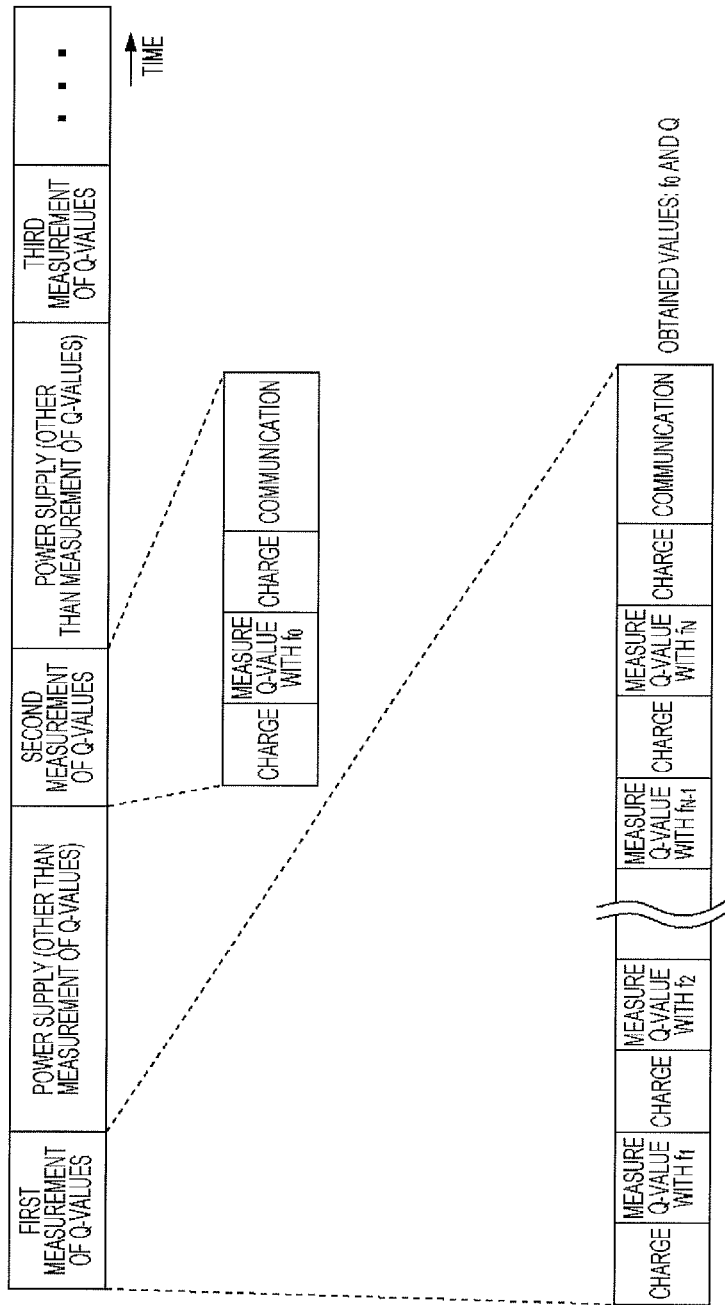
FIG. 4 is a diagram describing a Q-value-based foreign matter detection method.

FIGS. 2 to 4 are diagrams describing foreign matter detection methods which can be employed as a foreign matter detection function for wireless power supply.

The following methods are available as foreign matter detection methods that can be employed as a foreign matter detection function for wireless power supply.

That is, in addition to a method for detecting foreign matter by determining whether or not the current on a power transmission apparatus side is an eddy current, as described in the above-mentioned Japanese Unexamined Patent Application Publication No. 2001-275280, a method for determining whether or not foreign matter exists by performing a threshold process on the temperature between the power transmission apparatus 11 and the power reception apparatus 12 (hereinafter referred to as a temperature-based foreign matter detection method) is available as a foreign matter detection method.

Also, a method for determining whether or not foreign matter exists by performing a threshold process on change in load of the power reception apparatus 12 viewed from the power transmission apparatus 11 (hereinafter referred to as a load-based foreign matter detection method) is available as a foreign matter detection method.

Furthermore, a method for determining whether or not foreign matter exists by determining whether or not optical communication can be performed between the power transmission apparatus 11 and the power reception apparatus 12 (hereinafter referred to as a light-based foreign matter detection method) is available as a foreign matter detection method.

Also, a method for determining whether or not foreign matter exists by using an image of a region between the power transmission apparatus 11 and the power reception apparatus 12 (hereinafter referred to as an image-based foreign matter detection method) is available as a foreign matter detection method.

Furthermore, a method for determining whether or not foreign matter exists by performing a threshold process on power efficiency, which represents the ratio of the power received by the power reception apparatus 12 to the power transmitted from the power transmission apparatus 11 (hereinafter referred to as an efficiency-based foreign matter detection method), is available as a foreign matter detection method.

Also, a method for determining whether or not foreign matter exists by using a Q-value (quality factor) of the power reception coil of the power reception apparatus 12 (hereinafter referred to as a Q-value-based foreign matter detection method) is available as a foreign matter detection method.

Furthermore, a method for determining whether or not foreign matter exists by using an effective resistance value of the power reception coil of the power reception apparatus 12 (hereinafter referred to as an effective-resistance-based foreign matter detection method) is available as a foreign matter detection method.

In the temperature-based foreign matter detection method, a temperature sensor such as a thermistor is provided in the wireless power supply system, and if a temperature higher than or equal to a certain value is detected by the temperature sensor, it is determined that foreign matter exists.

An example of the temperature-based foreign matter detection method is described in Japanese Unexamined Patent Application Publication No. 2001-258182.

In the load-based foreign matter detection method, load modulation is performed by the power reception apparatus 12, and change in load of the power reception apparatus 12 viewed from the power transmission apparatus 11 is detected by the power transmission apparatus 11 on the basis of a modulation signal of load modulation performed by the power reception apparatus 12. If no change in load is detected in a threshold process regarding change in load of the power reception apparatus 12 viewed from the power transmission apparatus 11 (a process of comparing the change in load with a threshold), it is determined that foreign matter exists.

An example of the load-based foreign matter detection method is described in Japanese Unexamined Patent Application Publication No. 2008-206231.

In the light-based foreign matter detection method, optical communication is performed between the power transmission apparatus 11 and the power reception apparatus 12. If the optical communication is not appropriately performed, it is determined that foreign matter exists.

An example of the light-based foreign matter detection method is described in Japanese Unexamined Patent Application Publication No. 2001-112190.

In the image-based foreign matter detection method, for example, an image of a region between the power transmission apparatus 11 and the power reception apparatus 12 is captured, the image obtained thereby is compared with a pre-captured image of a portion having no foreign matter, and thereby it is determined whether or not foreign matter exists.

In the efficiency-based foreign matter detection method, the voltage and current, that is, the power of each of the power transmission apparatus 11 and the power reception apparatus 12 is measured. If power efficiency, which represents the ratio of the power of the power reception apparatus 12 to the power of the power transmission apparatus 11, is not higher than (or not higher than or equal to) a certain threshold, it is determined that foreign matter exists.

In the temperature-based foreign matter detection method or the light-based foreign matter detection method, for example, it is necessary to provide a sensor for sensing temperatures or light to the power transmission apparatus 11 or the power reception apparatus 12 such that the sensor is exposed to the outside. In this case, the design of the power transmission apparatus 11 or the power reception apparatus 12 may be limited.

Furthermore, in a case where wireless power supply is performed by using a magnetic-field resonance method, wireless power supply can be performed in a wide range (the degree of freedom of the positional relationship between the power transmission apparatus 11 and the power reception apparatus 12 is high). Thus, when the temperature-based foreign matter detection method or the light-based foreign matter detection method is employed in the power transmission apparatus 11 and the power reception apparatus 12, many sensors are necessary and the cost may increase accordingly.

In contrast, in the efficiency-based foreign matter detection method, for example, it is only necessary to measure voltage and current in the power transmission apparatus 11 and the power reception apparatus 12. This is advantageous in that many sensors are not necessary and that design is not limited.

In the Q-value-based foreign matter detection method, a Q-value of the power reception coil of the power reception apparatus 12 (Q-value of the power reception coil viewed from the inside of the power reception apparatus 12) is measured. If the Q-value is not larger than a certain threshold, it is determined that foreign matter exists.

Here, a Q-value of a (series) resonance circuit constituted by a coil L (a coil whose inductance is L) and a capacitor C (a capacitor whose capacitance is C) is expressed by equation (1).

$$Q = 2\pi f_r L/r \qquad (1)$$

Here, a resonance frequency is expressed by $$f_r = 1/(2\pi\sqrt{(LC)})$$

and the effective resistance value of the resonance circuit is represented by r. Hereinafter, the Q-value of the resonance circuit is also referred to as a Q-value of the coil L.

When metal approaches the coil L, the effective resistance value r increases, and accordingly the Q-value in equation (1) decreases.

In a case where the coil L is employed as the power reception coil of the power reception apparatus 12, the Q-value of the coil L as the power reception coil is kept constant as long as a factor of fluctuating $f_r$, L, and r in the right side of equation (1), such as approach of metal, does not occur.

That is, in the power reception apparatus 12, metal is contained in the casing thereof or in the components inside the casing in some cases, but the positional relationship between the metal and the power reception coil may not change. Thus, the Q-value of the coil L as the power reception coil does not change, although the Q-value is smaller than in a case where the casing contains no metal, due to the metal contained in the casing or the components inside the casing.

Products for various applications, such as mobile terminals and electric vehicles, can be the power reception apparatus 12, and thus it is difficult not to use metal as the material of the casing thereof. However, since the power transmission apparatus 11 is an apparatus for performing wireless power supply, a configuration without metal can be employed for the casing of the power transmission apparatus 11 (particularly, a portion which the power reception apparatus 12 approaches).

In this case, even if the power reception apparatus 12 is brought near the power transmission apparatus 11, the Q-value of the coil L as the power reception coil of the power reception apparatus 12 does not change or hardly changes, and the Q-value changes only when metal as foreign matter approaches.

That is, the coil L as the power reception coil of the power reception apparatus 12 has a unique Q-value because of an influence of metal or the like contained in the casing of the power reception apparatus 12. The Q-value is kept constant (does not change) as long as metal is not brought near the coil L.

Thus, on the basis of the unique Q-value of the coil L as the power reception coil of the power reception apparatus 12 in a state where metal is not near the coil L (hereinafter referred to as a standard Q-value), alpha times (0<alpha<1) the standard Q-value is set as a threshold of the unique Q-value (hereinafter referred to as a threshold Q-value), and a threshold process using the threshold Q-value is performed on the Q-value of the coil L. Accordingly, metal as foreign matter can be accurately detected.

As described above, it is difficult not to use metal as a material of the casing of the power reception apparatus 12, and various types of power reception apparatuses 12 having various casings containing metal may be brought near the power transmission apparatus 11. Thus, the Q-value of the power transmission coil of the power transmission apparatus 11 changes (decreases) when the power reception apparatus 12 whose casing contains metal is brought near the power transmission apparatus 11, as well as when metal as foreign matter exists near the power transmission apparatus 11. Thus, it is difficult to distinguish, by using the Q-value of the power transmission coil of the power transmission apparatus 11, a case where metal as foreign matter exists and a case where the power reception apparatus 12 whose casing contains metal has approached.

In the effective-resistance-based foreign matter detection method, an effective resistance value r of the power reception coil of the power reception apparatus 12 (an effective resistance value r of the power reception coil viewed from the inside of the power reception apparatus 12) is measured. If the effective resistance value r is not smaller than (or smaller than or equal to) a certain threshold, it is determined that foreign matter exists.

Here, in accordance with equation (1) and the above equation which expresses the resonance frequency $f_r$, $$f_r = 1/(2\pi\sqrt{(LC)})$$

the effective resistance value r in a case where the coil L is employed as the power reception coil of the power reception apparatus 12 is expressed by equation (2).

$$r = 2\pi f_r L/Q = 1/(2\pi f_r CQ) \qquad (2)$$

Thus, the effective resistance value r can be calculated by using, for example, the inductance L and the Q-value.

As in the case of a Q-value, the coil L as the power reception coil of the power reception apparatus 12 has a unique effective resistance value r as long as metal is not brought near the coil L, due to an influence of metal or the like contained in the casing of the power reception apparatus 12. The effective resistance value r increases when metal is brought near the coil L.

Thus, on the basis of the effective resistance value r of the coil L as the power reception coil of the power reception apparatus 12 in a state where metal is not near the coil L, beta times (2>beta>1) the effective resistance value r is set as a unique threshold, and a threshold process using the threshold is performed on the effective resistance value r of the coil L. Accordingly, metal as foreign matter can be accurately detected.

FIG. 2 is a diagram describing the efficiency-based foreign matter detection method.

That is, FIG. 2 schematically illustrates positional relationships between the power transmission coil of the power transmission apparatus 11 and the power reception coil of the power reception apparatus 12.

Referring to FIG. 2, in a three-dimensional coordinate system in which the horizontal direction corresponds to an x-axis, the depth direction corresponds to a y-axis, and the vertical direction corresponds to a z-axis, it is assumed that the power transmission coil is positioned at the origin (0, 0, 0).

A state where the power reception coil is positioned at a point on the z-axis (0, 0, Z) is referred to as "the power reception coil faces the power transmission coil" or "the power reception coil is in a face-to-face state".

Furthermore, in this embodiment, the z-coordinate of the power reception coil is fixed to a certain value Z for simple description.

When the power reception coil is in a face-to-face state, as illustrated on the left side of FIG. 2, power efficiency is the highest. Power efficiency is the percentage of the power received by the power reception apparatus 12 with respect to the power transmitted by the power transmission apparatus 11. In FIG. 2, power efficiency may be approximately 90% when the power reception coil is in a face-to-face state.

When the power reception coil is displaced, as illustrated at the center of FIG. 2, power efficiency decreases. Particularly, in the electromagnetic induction method, change (decrease) in power efficiency caused by a displacement can be significant.

When metal or the like as foreign matter exists between the power transmission coil and the power reception coil, power efficiency decreases even if the power reception coil is in a face-to-face state, as illustrated on the right side of FIG. 2.

In the efficiency-based foreign matter detection method, it is difficult to determine whether the cause of a decrease in power efficiency is a displacement or the existence of foreign matter.

In FIG. 2, power efficiency is 60% when a displacement occurs, and power efficiency is 70% when foreign matter exists.

In this way, the power efficiency in a case where a displacement occurs may be lower than the power efficiency in a case where foreign matter exists.

FIG. 3 illustrates the relationship between the positional relationship between the power transmission coil and the power reception coil (displacement of the power reception coil) and power efficiency (inter-coil efficiency).

In FIG. 3, a coil of a 40 mm square may be used as the power transmission coil, and a coil of a 30 mm square may be used as the power reception coil, and the distance between the power transmission coil and the power reception coil (the z-coordinate Z of the power reception coil) is 4 mm.

In FIG. 3, X and Y represent the x-coordinate and the y-coordinate of the power reception coil, respectively.

L1 represents the inductance of the power transmission coil when the power reception coil is open (L2_open) and the inductance of the power transmission coil when the power reception coil is short (L2_short).

k represents the coupling coefficient between the power transmission coil and the power reception coil, and Q1 and Q2 represent the Q-value of the power transmission coil and the Q-value of the power reception coil, respectively.

In FIG. 3, S may be expressed by the following equation, and hereinafter referred to as an S value.

$$S = k \times \sqrt{(Q1 \times Q2)}$$

Inter-coil efficiency is a kind of power efficiency, and may be the percentage of the power obtained by the power reception coil with respect to the power supplied to the power transmission coil. The theoretical maximum value $\eta_{max}$ of inter-coil efficiency may be expressed by the following equation.

$$\eta_{max} = S^2 / (1 + \sqrt{(1+S^2)})^2$$

Here, examples of power efficiency include DC-DC efficiency, as well as inter-coil efficiency.

DC-DC efficiency is the percentage of the power which is calculated by using DC voltage and current obtained from the power received by the power reception coil of the power reception apparatus, with respect to the power which is calculated by using DC voltage and current used to transmit power from the power transmission coil of the power transmission apparatus.

Transmission efficiency in the power transmission apparatus in a case where power is transmitted to the power transmission coil from a position where DC voltage and current are applied to transmit power from the power transmission coil, and transmission efficiency in the power reception apparatus in a case where power is transmitted from the power reception coil to a position where DC voltage and current are obtained, are defined as circuit efficiency. In this case, DC-DC efficiency can be calculated by multiplying inter-coil efficiency by circuit efficiency.

For example, in a case where a degree of freedom of about 10 mm is set in the x and y directions as the degree of freedom (allowance) of a displacement of the power reception coil, power efficiency (inter-coil efficiency) is 85.5% at minimum, as illustrated in FIG. 3. Thus, in the efficiency-based foreign matter detection method, the threshold of power efficiency used for detecting foreign matter may be set to be a value smaller than 85.5%, for example, 85%.

In this case, if power efficiency is not higher than 85%, which is the threshold, it is determined that foreign matter exists.

For example, in a case where a degree of freedom of about 15 mm is set in the x and y directions as the degree of freedom of displacement of the power reception coil, power efficiency (inter-coil efficiency) is 62.7% at minimum, as illustrated in FIG. 3. Thus, in the efficiency-based foreign matter detection method, the threshold of power efficiency used for detecting foreign matter is set to be a value smaller than 62.7%, for example, 62%.

In this case, if power efficiency is not higher than 62%, which is the threshold, it is determined that foreign matter exists.

Now, it is assumed that power efficiency is about 70% when the power reception coil is in a face-to-face state and when foreign matter exists, as illustrated in FIG. 2. In this case, if the degree of freedom of displacement is set to be about 15 mm and if the threshold is set to be 62%, as described above, power efficiency is 70%, which is higher than the threshold of 62%, even if the power reception coil is in a face-to-face state and foreign matter exists. Thus, it is not determined that foreign matter exists, and foreign matter is not detected.

As described above, the accuracy of detecting foreign matter in the efficiency-based foreign matter detection method is not high.

Furthermore, in view of manufacturing variation of power reception coils or other circuits of power reception apparatuses, it is necessary to use a smaller threshold of power efficiency (a value with which foreign matter is unlikely to be detected) in order to ensure a certain degree of freedom of displacement. In this case, the accuracy of detecting foreign matter in the efficiency-based foreign matter detection method further decreases.

In order to increase the detection accuracy of the efficiency-based foreign matter detection method, a method of not setting the degree of freedom of displacement or a method of limiting the degree of freedom to a small value may be used. In that case, however, the usability of wireless power supply degrades.

As described above, in the efficiency-based foreign matter detection method, the accuracy of detecting foreign matter and usability are in a trade-off relationship.

In this embodiment, it is assumed that the casing of the power transmission apparatus 11 (particularly, a portion which the power reception apparatus 12 approaches) has a configuration without metal (a configuration with which the Q-value of the power reception coil of the power reception apparatus 12 does not fluctuate when the power reception apparatus 12 approaches the power transmission apparatus 11), as described above.

In this case, the positional relationship between the power transmission apparatus 11 and the power reception apparatus 12 does not affect the Q-value of the power reception coil (Q2). Therefore, in FIG. 3, the Q-value of the power reception coil (Q2), that is, the Q-value of the power reception coil viewed from the inside of the power reception apparatus 12, is constant regardless of the position (X, Y) of the power reception apparatus 12.

FIG. 4 is a diagram describing the Q-value-based foreign matter detection method.

As described above, in the Q-value-based foreign matter detection method, a threshold (threshold Q-value) is determined on the basis of the Q-value of the coil L in a state where no metal is near the coil L as the power reception coil of the power reception apparatus 12 (standard Q-value), and a threshold process using the threshold Q-value is performed on the Q-value of the power reception coil. Accordingly, metal as foreign matter is detected.

The power reception coil of the power reception apparatus 12 has a unique Q-value, due to an influence of metal or the like contained in the casing of the power reception apparatus 12, as described above. The Q-value of the power reception coil changes when metal is brought near the coil L, and is not affected by a displacement with respect to the power transmission apparatus 11. Thus, with the Q-value-based foreign matter detection method, foreign matter can be accurately detected while usability being ensured, both in the electromagnetic induction method and the magnetic-field resonance method.

An example of the Q-value-based foreign matter detection method is described in Japanese Patent Application No. 2011-149465, which has been filed by the applicant of the present application.

In order to calculate the Q-value of the power reception coil, it is necessary to apply a voltage to a series resonance circuit which includes the power reception coil as an element in the power reception apparatus 12, and to measure necessary voltage and current.

The Q-value of the power reception coil (the series resonance circuit which includes the power reception coil as an element) is expressed by equation (3), in which $V_1$ represents the voltage applied to the series resonance circuit and $V_2$ represents the voltage applied to the power reception coil.

$$Q=(V_2-V_1)/V_1 \tag{3}$$

Here, the inductance of the power reception coil and the capacitance of the capacitor constituting the series resonance circuit, and the resistance value of an effective resistor (effective resistance value) are represented by L, C, and r, respectively, and it is assumed that a voltage of the resonance frequency $f_r$ is applied to the series resonance circuit. In this case, the equation $$j2\pi f_r L = 1/(j2\pi f_r C)$$

is satisfied, and $$(j=\sqrt{(-1)})$$

is satisfied, that is, the impedance of the power reception coil $$j2\pi f_r L$$

and the impedance of the capacitor $$1/(j2\pi f_L C)$$

compensate each other. Thus, the voltage $V_1$ applied to the series resonance circuit is equal to the voltage $V_r$ applied to the effective resistor.

The voltage $V_2$ applied to the power reception coil is equal to the sum of voltage drop $v_L$ of the (ideal) power reception coil without an effective resistor and voltage drop $v_r$ of the effective resistor ($v_L+v_r$).

On the other hand, the current which flows through the power reception coil constituting the series resonance circuit and the current which flows through the effective resistor are equal to each other, and thus the following equation is satisfied.

$$v_r/r=v_L/(2\pi f_r L)$$

Thus, equation (1) is expressed by equation (4) by substituting the equation $$v_r/r=v_L/(2\pi f_r L)$$

and by using the voltage drop $v_L$ of the power reception coil and the voltage drop $v_r$ of the effective resistor.

$$Q=2\pi f_r L/r = v_L/v_r \tag{4}$$

The voltage $V_1$ applied to the series resonance circuit is equal to the voltage $v_r$ applied to the effective resistor, and the voltage $V_2$ applied to the power reception coil is equal to the sum of the voltage drop $v_L$ of the power reception coil and the voltage drop $v_r$ of the effective resistor. Thus, the voltage $v_r$ applied to the effective resistor is expressed by the voltage $V_1$ ($=v_r$), and the voltage drop $v_L$ of the power reception coil is expressed by the voltage $V_2-V_1$ ($=v_L+v_r-v_r$).

Accordingly, the Q-value in equation (4) is expressed by equation (3) ($Q=(V_2-V_1)/V_1$) by using the voltages $V_1$ and $V_2$.

Here, if the voltage applied to the series resonance circuit is the voltage of the resonance frequency $f_r$, the voltage drop $V_L$ of the power reception coil is sufficiently larger than the voltage $v_r$ applied to the effective resistor in a typical case, and thus the voltage $V_2=v_L+v_r$ is sufficiently larger than the voltage $V_1=v_r$. Thus, the Q-value in equation (3) can be approximated by equation (5).

$$Q=V_2/V_1 \tag{5}$$

Alternatively, for example, the Q-value of the power reception coil (the series resonance circuit including the power reception coil as an element) can be calculated with a half-width method, by using the impedance $Z=V/I$ which is obtained by measuring a voltage V applied to the series resonance circuit and a current I which flows through the series resonance circuit.

That is, the Q-value can be calculated in accordance with the equation $Q=f_r/(f_H-f_L)$ by obtaining a frequency $f_L$ and a frequency $f_H$. The frequency $f_L$ is lower than the resonance frequency $f_r$, and the frequency $f_H$ is higher than the resonance frequency $f_r$, when the impedance becomes the square root of 2 times the impedance Z in a case where the frequency of the voltage applied to the series resonance circuit is the resonance frequency $f_r$.

In the Q-value-based foreign matter detection method, a process of the first measurement of Q-values is performed, and then power is wirelessly supplied from the power transmission apparatus 11 to the power reception apparatus 12, as illustrated in FIG. 4.

After that, a process of the second measurement of Q-values, a process of the third measurement of Q-values, etc. are performed periodically or non-periodically.

In the process of the first measurement of Q-values, in view of a case where the power reception apparatus 12 does not have a power source, the power reception apparatus 12 is charged to obtain the power that is necessary for performing the process of the first measurement of Q-values.

That is, the power transmission apparatus 11 transmits power, and the power reception apparatus 12 receives the power from the power transmission apparatus 11 so as to be charged.

For example, after being charged with the power that is necessary for performing one operation of measuring a Q-value, the power reception apparatus 12 stops being charged and operates by using the power obtained through the charging. Then, the power reception apparatus 12 applies a voltage of a certain frequency $f_1$ to the power reception coil (series resonance circuit including the power reception coil as an element) and measures a Q-value.

Subsequently, the power reception apparatus 12 starts being charged again. After being charged with the power that is necessary for performing one operation of measuring a Q-value, the power reception apparatus 12 stops being charged and operates by using the power obtained through the charging. Then, the power reception apparatus 12 applies a voltage of a frequency $f_n$, which is higher than a frequency $f_{n-1}$ used in the preceding measurement of a Q-value, to the power reception coil, and measures a Q-value.

In this way, the power reception apparatus 12 repeats charging and measurement of a Q-value, thereby obtaining Q-values for predetermined N frequencies, that is, frequencies $f_1, f_2, \ldots,$ and $f_N$.

As the N frequencies $f_1, f_2, \ldots,$ and $f_N$, frequencies in a frequency band in a certain range can be used, for example. The center of the frequency band is a theoretical resonance frequency $f_1$ expressed by $$f_r = 1/(2\pi\sqrt{(LC)})$$

which is calculated by using the inductance of the power reception coil and the capacitance C of the capacitor of the series resonance circuit which includes the power reception coil of the power reception apparatus 12 as an element.

After obtaining the Q-values for the N frequencies $f_1$ to $f_N$, the power reception apparatus 12 starts being charged to perform the subsequent process.

Then, the power reception apparatus 12 determines the maximum value among the N Q-values to be the Q-value of the power reception coil, and determines the frequency $f_0$ with which the Q-value was obtained to be a resonance frequency.

Furthermore, the power reception apparatus 12 stores the resonance frequency $f_0$, and transmits the Q-value of the power reception coil together with a threshold Q-value to the power transmission apparatus 11 by using load modulation or the like. Then, the process of the first measurement of Q-values ends.

Here, it is assumed that the power reception apparatus 12 predetermines a threshold (threshold Q-value) on the basis of the Q-value of the coil L in a state where metal as foreign matter is not near the power reception coil of the power reception apparatus 12 (standard Q-value), and stores the threshold.

After the process of the first measurement of Q-values ends, power (power for the power reception apparatus 12 to perform a normal operation) may be wirelessly supplied (transmitted) from the power transmission apparatus 11 to the power reception apparatus 12.

In a process of the m-th measurement of Q-values performed thereafter, the power reception apparatus 12 is charged with the power that is necessary to perform one operation of measuring a Q-value. After the power reception apparatus 12 has been charged, the charging operation stops.

Then, the power reception apparatus 12 applies a voltage of the resonance frequency $f_0$ to the power reception coil, and measures the Q-value of the power reception coil.

Furthermore, the power reception apparatus 12 is charged to transmit the Q-value of the power reception coil to the power transmission apparatus 11, and transmits the Q-value of the power reception coil together with a threshold Q-value to the power transmission apparatus 11 by using load modulation or the like. Then, the process of the m-th measurement of Q-values ends.

On the other hand, the power transmission apparatus 11 intermittently transmits power to the power reception apparatus 12 as described above, and receives the Q-value of the power reception coil and the threshold Q-value which are transmitted in the process of the m-th measurement of Q-values.

Then, the power transmission apparatus 11 performs a threshold process of comparing the Q-value of the power reception coil with the threshold Q-value. If the Q-value of the power reception coil is not larger than the threshold Q-value, the power transmission apparatus 11 determines that foreign matter exists, and stops transmitting power.

Here, the threshold process of comparing the Q-value of the power reception coil with the threshold Q-value may be performed by the power reception apparatus 12, instead of the power transmission apparatus 11. In this case, if the Q-value of the power reception coil is not larger than the threshold Q-value, the power reception apparatus 12 determines that foreign matter exists, and transmits the determination result to the power transmission apparatus 11.

The power transmission apparatus 11 stops transmitting power upon receiving the determination result indicating that foreign matter exists from the power reception apparatus 12.

The power transmission apparatus 11 transmits power to the power reception apparatus 12 in the above-described manner. However, while the power reception apparatus 12 is measuring a Q-value in the process of the m-th measurement of Q-values, the power transmission apparatus 11 temporarily stops transmitting power for the measurement.

That is, in the process of the m-th measurement of Q-values, the power transmission apparatus 11 intermittently stops transmitting power, and the power reception apparatus 12 measures a Q-value during a period in which transmission of power from the power transmission apparatus 11 is suspended. This is because it is difficult to accurately measure the Q-value of the power reception coil if electromotive force is generated by the power reception coil of the power reception apparatus 12 in accordance with the power transmitted from the power transmission apparatus 11.

Therefore, in the Q-value-based foreign matter detection method, the accuracy of detecting foreign matter is high, but the power transmission apparatus 11 intermittently stops transmitting power, and thus the temporal efficiency of wireless power supply is not high.

As described above, the Q-value-based foreign matter detection method realizes high accuracy in detecting foreign matter, but is not advantageous in temporal efficiency of wireless power supply.

On the other hand, the efficiency-based foreign matter detection method is not advantageous in the accuracy of detecting foreign matter. However, unlike in the Q-value-based foreign matter detection method, it is not necessary for the power transmission apparatus 11 to intermittently stop transmitting power, and thus the issue of temporal efficiency of wireless power supply does not arise.

Accordingly, in the wireless power supply system illustrated in FIG. 1, detection of foreign matter is performed with high accuracy and wireless power supply is efficiently performed without a loss of usability, by using a new detection method in which both of the Q-value-based foreign matter detection method and the efficiency-based foreign matter detection method are used.

III. Example Configuration of Power Transmission Apparatus 11

Figure 5:
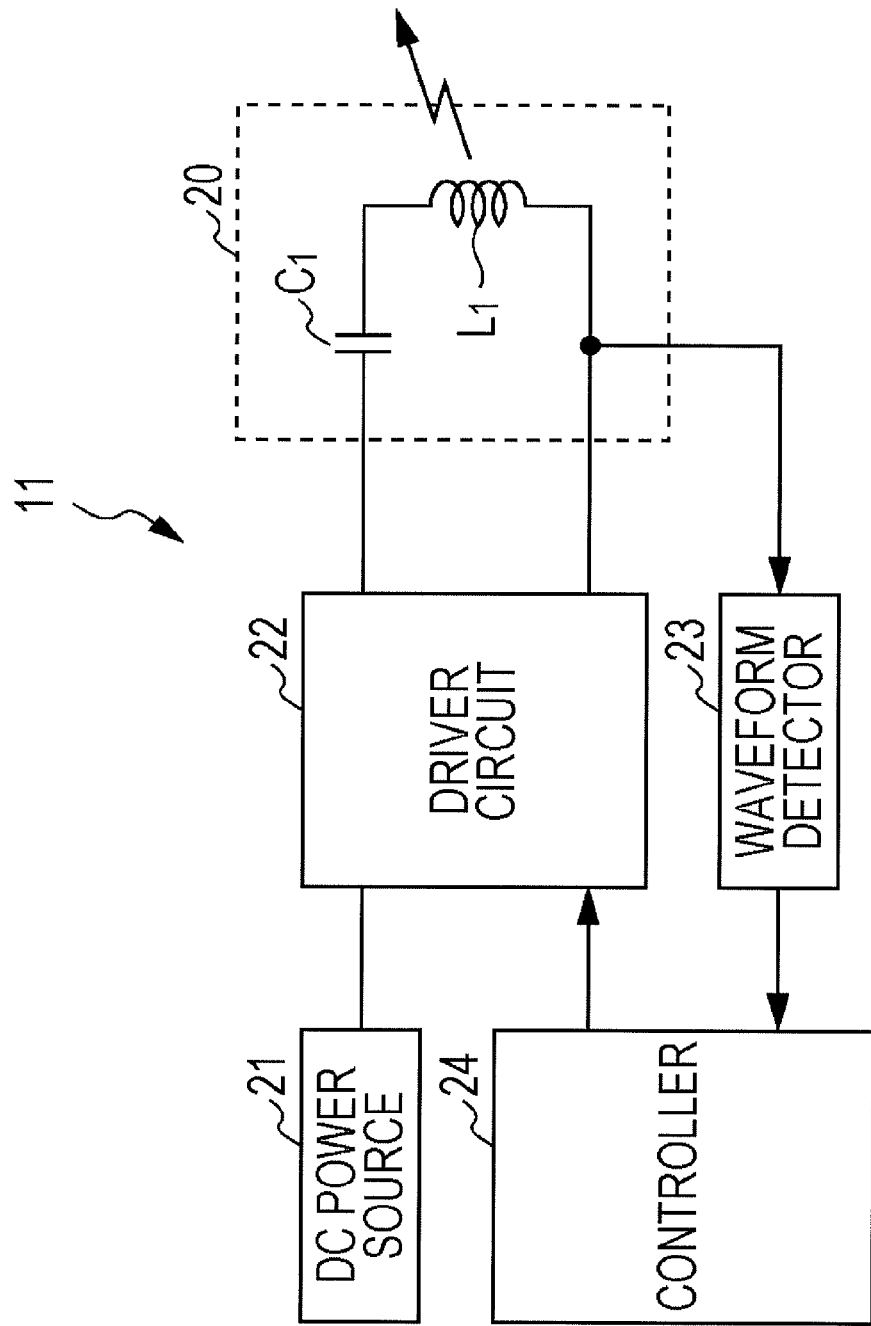
FIG. 5 is a block diagram illustrating an example configuration of a power transmission apparatus.

FIG. 5 is a block diagram illustrating an example configuration of the power transmission apparatus 11 illustrated in FIG. 1.

Referring to FIG. 5, the power transmission apparatus 11 includes a resonance circuit 20, a DC power source 21, a driver circuit 22, a waveform detector 23, and a controller 24.

The resonance circuit 20 is a series resonance circuit constituted by a power transmission coil $L_1$ and a capacitor $C_1$, and is driven by the driver circuit 22. When the resonance circuit 20 is driven, a magnetic flux (magnetic field) is generated by the power transmission coil $L_1$, and the magnetic flux causes power to be transmitted to the power reception apparatus 12 with the electromagnetic induction method or the magnetic-field resonance method.

The DC power source 21 supplies a certain DC voltage (current) to the driver circuit 22.

The driver circuit 22 drives the resonance circuit 20 by using the DC voltage supplied from the DC power source 21, and causes the power transmission coil $L_1$ constituting the resonance circuit 20 to generate a magnetic flux, thereby transmitting power by using the electromagnetic induction method or the magnetic-field resonance method.

The waveform detector 23 detects, in accordance with the current or voltage in the resonance circuit 20, information transmitted from the power reception apparatus 12 using load modulation, and supplies the information to the controller 24.

The controller 24 controls the individual blocks constituting the power transmission apparatus 11, including the driver circuit 22, on the basis of the information supplied from the waveform detector 23.

Figure 6:
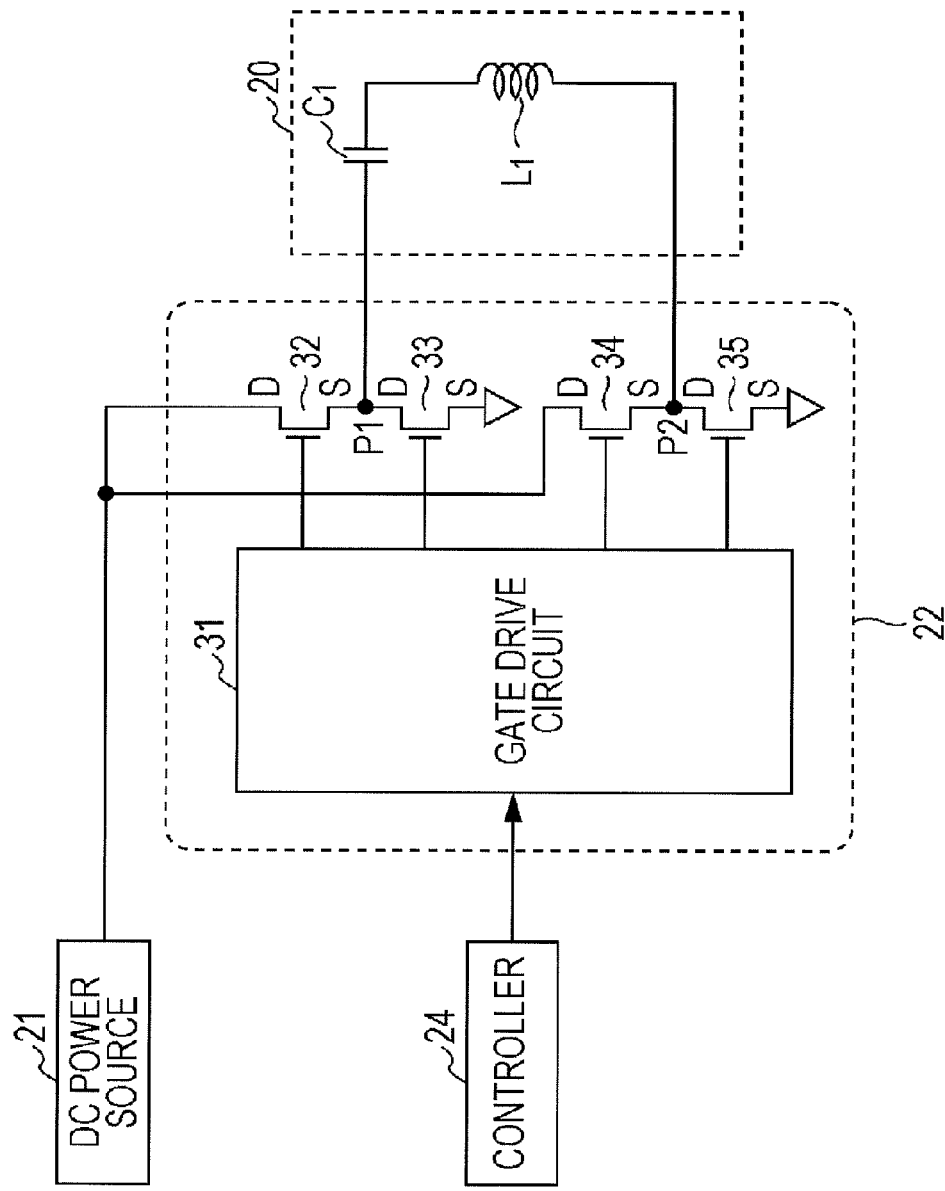
FIG. 6 is a circuit diagram illustrating an example configuration of a driver circuit.

FIG. 6 is a circuit diagram illustrating an example configuration of the driver circuit 22 illustrated in FIG. 5.

Referring to FIG. 6, the driver circuit 22 is constituted by a full-bridge circuit.

That is, the driver circuit 22 includes a gate drive circuit 31, and field effect transistors (FETs) 32, 33, 34, and 35 of negative channel metal oxide semiconductor (NMOS).

The gate drive circuit 31 applies a certain voltage to the gates of the FETs 32 to 35 in accordance with the control performed by the controller 24, thereby turning ON/OFF the FETs 32 to 35.

The drain of the FET 32 is connected to the DC power source 21. Accordingly, a certain DC voltage output from the DC power source 21 is applied to the drain of the FET 32.

The source of the FET 32 is connected to the drain of the FET 33, and the source of the FET 33 is grounded (connected to the ground).

The FETs 34 and 35 are connected in a similar manner to the FETs 32 and 33.

That is, the drain of the FET 34 is connected to the DC power source 21, and the source of the FET 34 is connected to the drain of the FET 35. The source of the FET 35 is grounded.

Furthermore, one end of the resonance circuit 20 is connected to a connection point P1 between the source of the FET 32 and the drain of the FET 33, and the other end of the resonance circuit 20 is connected to a connection point P2 between the source of the FET 34 and the drain of the FET 35.

In the resonance circuit 20 illustrated in FIG. 6, one end of the power transmission coil $L_1$ is connected to one end of the capacitor $C_1$. The other end of the capacitor $C_1$ is connected to the connection point P1 between the source of the FET 32 and the drain of the FET 33, and the other end of the power transmission coil $L_1$ is connected to the connection point P2 between the source of the FET 34 and the drain of the FET 35.

In the driver circuit 22 having the above-described configuration, the gate drive circuit 31 applies a certain voltage to the gates of the FETs 32 to 35, thereby controlling the FETs 32 to 35 to turn them ON/OFF.

Accordingly, the FETs 32 and 33 complementarily and periodically come into an ON-state and an OFF-state.

That is, the FET 32 periodically and alternately comes into an ON-state and an OFF-state.

When the FET 32 comes into an ON-state, the FET 33 comes into an OFF-state.

When the FET 32 comes into an OFF-state, the FET 33 comes into an ON-state.

The set of the FETs 34 and 35 complementarily and periodically comes into an ON-state and an OFF-state with respect to the set of the FETs 32 and 33.

That is, when the FET 32 comes into an ON-state and the FET 33 comes into an OFF-state, the FET 34 comes into an OFF-state and the FET 35 comes into an ON-state.

Furthermore, when the FET 32 comes into an OFF-state and the FET 33 comes into an ON-state, the FET 34 comes into an ON-state and the FET 35 comes into an OFF-state.

For example, regarding the FET 32, when the FET 32 is in an ON-state, the FET 33 is in an OFF-state, the FET 34 is in an OFF-state, and the FET 35 is in an ON-state.

As a result, at the connection point P1 between the source of the FET 32 and the drain of the FET 33, the level becomes high (H), which corresponds to a certain DC voltage output from the DC power source 21. At the connection point P2 between the source of the FET 34 and the drain of the FET 35, the level becomes low (L), which corresponds to a ground level.

Thus, in the resonance circuit 20, current flows from the connection point P1 toward the connection point P2 through the capacitor $C_1$ and the power transmission coil $L_1$.

On the other hand, when the FET 32 is in an OFF-state, the FET 33 is in an ON-state, the FET 34 is in an ON-state, and the FET 35 is in an OFF-state.

As a result, at the connection point P2 between the source of the FET 34 and the drain of the FET 35, the level becomes high (H), which corresponds to a certain DC voltage output from the DC power source 21. At the connection point P1 between the source of the FET 32 and the drain of the FET 33, the level becomes low (L), which corresponds to a ground level.

Thus, in the resonance circuit 20, current flows from the connection point P2 toward the connection point P1 through the power transmission coil $L_1$ and the capacitor $C_1$.

In the above-described manner, an AC voltage of a period in which the FETs 32 to 35 come into an ON-state (or OFF-state) is applied to the resonance circuit 20, and an alternating current of a similar period flows in accordance with the application of the AC voltage.

While an AC voltage is being applied to the resonance circuit 20, a magnetic flux is continuously generated by the power transmission coil $L_1$, and the magnetic flux causes power to be transmitted.

The period in which the FETs 32 to 35 come into an ON-state (or OFF-state) is set to be, for example, the reciprocal of the resonance frequency of the resonance circuit 20

$$1/(2\pi\sqrt{(L_1 C_1)})$$

on the basis of the resonance frequency of the resonance circuit 20.

In FIG. 6, a full-bridge circuit is employed as the driver circuit 22. Alternatively, for example, a half-bridge circuit, a class E amplifier circuit, or the like may be employed as the driver circuit 22.

IV. Example Configuration of Power Reception Apparatus 12

Figure 7:
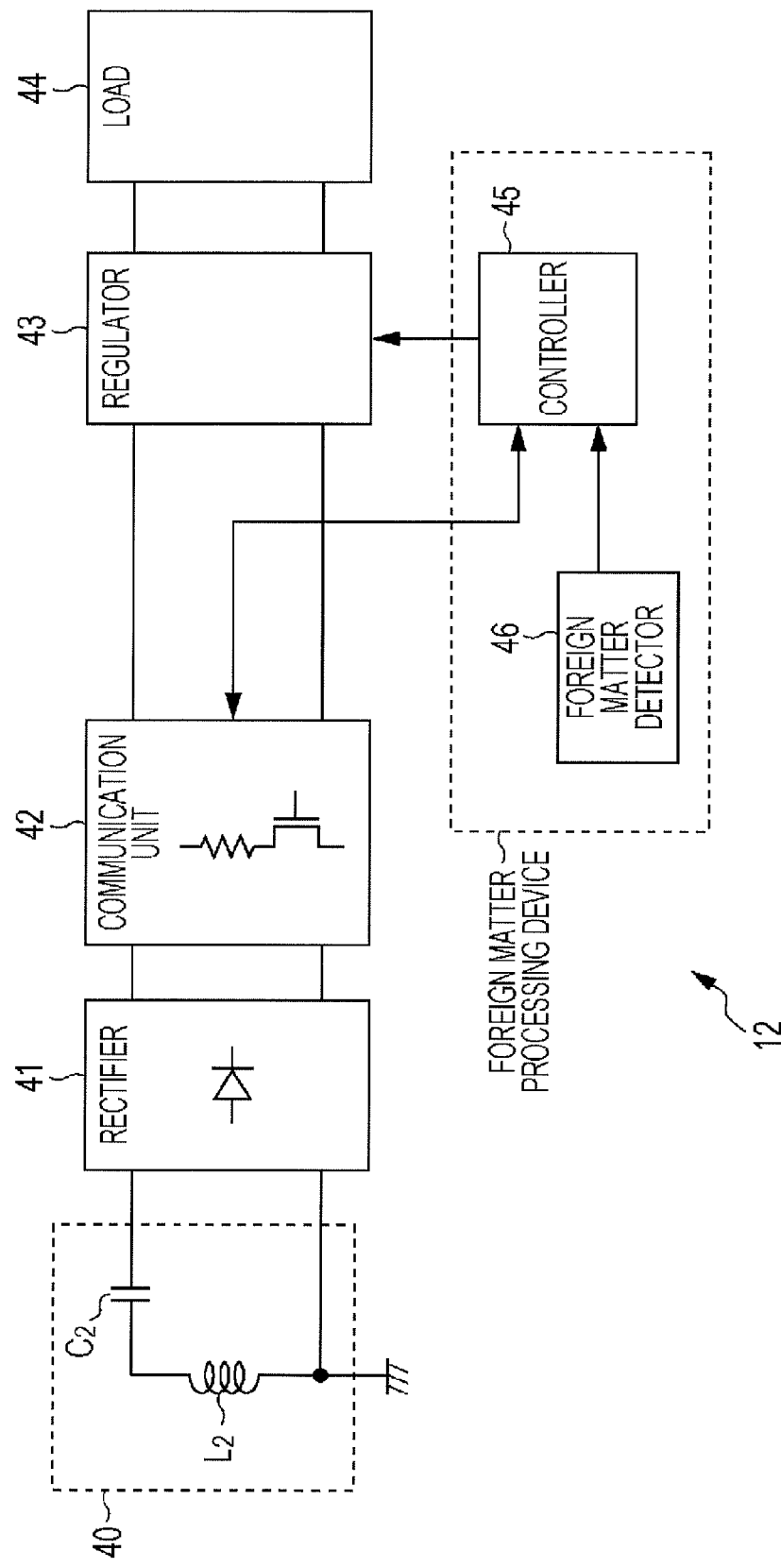
FIG. 7 is a block diagram illustrating an example configuration of a power reception apparatus.

FIG. 7 is a block diagram illustrating an example configuration of the power reception apparatus 12 illustrated in FIG. 1.

Referring to FIG. 7, the power reception apparatus 12 includes a resonance circuit 40, a rectifier 41, a communication unit 42, a regulator 43, a load 44, a controller 45, and a foreign matter detector 46.

The resonance circuit 40 is a series resonance circuit constituted by a power reception coil $L_2$ and a capacitor $C_2$, and is connected to the rectifier 41.

In the resonance circuit 40, a magnetic flux generated by the power transmission coil $L_1$ of the power transmission apparatus 11 (FIG. 5) flows through the power reception coil $L_2$, and accordingly current flows through the power reception coil $L_2$ and also through the resonance circuit 40. Accordingly, the power transmitted from the power transmission apparatus 11 is received.

The rectifier 41 is constituted by, for example, a bridge rectifier circuit or the like. The rectifier 41 rectifies a current (voltage) which flows through the resonance circuit 40, and supplies the current (voltage) to the regulator 43 via the communication unit 42.

The communication unit 42 includes, for example, an FET and a resistor. The FET comes into an ON-state or an OFF-state in accordance with the control performed by the controller 45, so that the resistor is connected to or disconnected from the resonance circuit 40 via the rectifier 41.

When the resistor is connected to or disconnected from the resonance circuit 40, the impedance of the resonance circuit 40 serving as a load viewed from the (external) power transmission apparatus 11 changes, and load modulation is performed on the current which flows through the resonance circuit 20 of the power transmission apparatus 11 (FIG. 5).

The regulator 43 stabilizes the current (voltage) supplied from the rectifier 41 via the communication unit 42, and supplies the current (voltage) to the load 44.

The load 44 is a circuit which uses the power transmitted through wireless power supply, such as a battery.

The controller 45 controls supply of power (voltage and current) from the regulator 43 to the load 44 on the basis of a detection (determination) result about foreign matter notified from the foreign matter detector 46.

That is, the controller 45 controls the regulator 43, and thereby basically causes the regulator 43 to supply power to the load 44.

Note that, in a case where a detection result indicting that foreign matter exists is supplied from the foreign matter detector 46, or in another necessary case, the controller 45 controls the regulator 43 to stop supplying power to the load 44.

Also, the controller 45 causes the FET of the communication unit 42 to come into an ON-state or an OFF-state, thereby transmitting necessary information to the power transmission apparatus 11 by using load modulation.

The foreign matter detector 46 detects foreign matter by using the new detection method, and supplies the detection result to the controller 45.

That is, the foreign matter detector 46 determines whether or not foreign matter which affects wireless power supply exists, by using a first detection method before wireless power supply to the load 44 starts.

If it is determined with the first detection method that no foreign matter exists, the power transmitted through wireless power supply is supplied to the load 44 via the resonance circuit 40, the rectifier 41, the communication unit 42, and the regulator 43.

While power is being supplied to the load 44, the foreign matter detector 46 determines whether or not foreign matter exists by using a second detection method, which is different from the first detection method.

If the foreign matter detector 46 determines that foreign matter exists, the foreign matter detector 46 supplies a detection result indicating that foreign matter exists to the controller 45.

In the power reception apparatus 12, the controller 45 and the foreign matter detector 46 constitute a processing device which performs a process related to foreign matter (foreign matter processing device).

Figure 8:
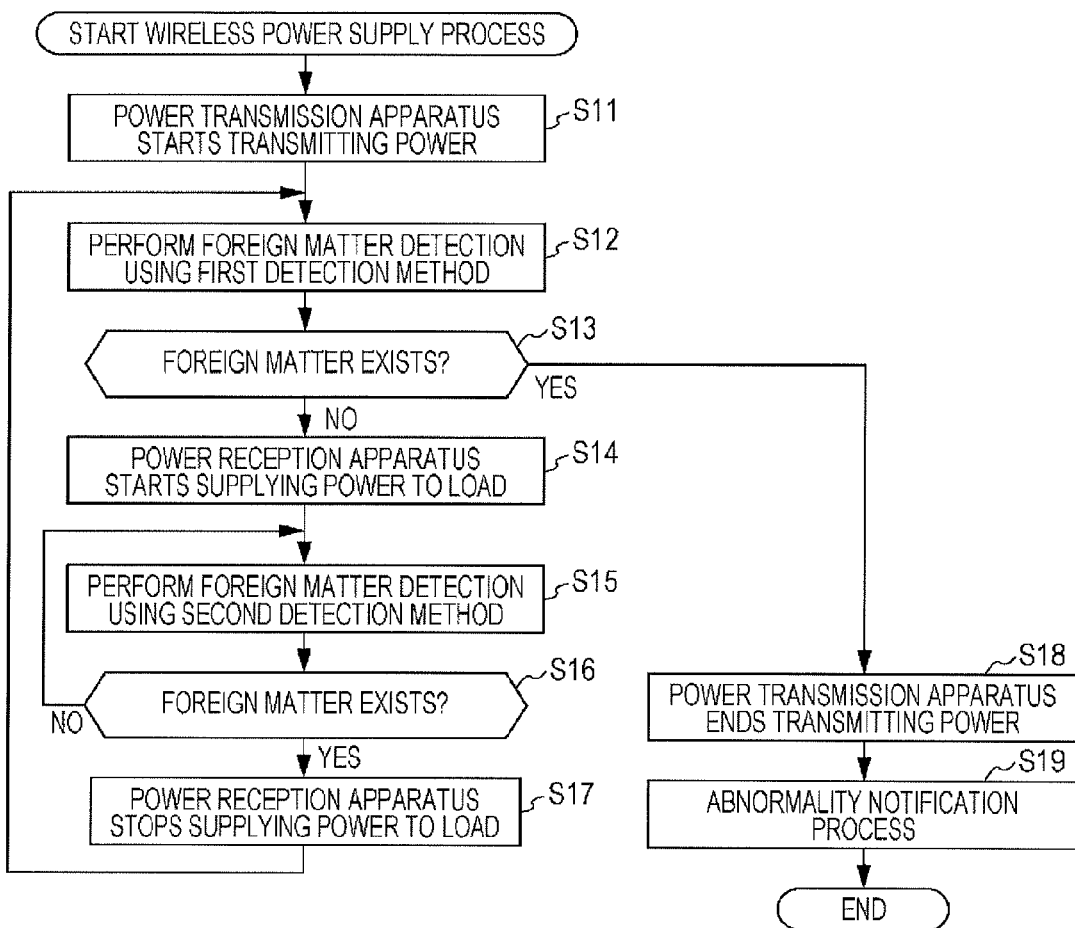
FIG. 8 is a flowchart describing a wireless power supply process performed in the wireless power supply system.

FIG. 8 is a flowchart describing a wireless power supply process performed in the wireless power supply system illustrated in FIG. 1, in which foreign matter detection is performed using the new detection method.

In step S11, the power transmission apparatus 11 starts transmitting power, and the process proceeds to step S12.

Here, the power transmission apparatus 11 starts transmitting power upon recognizing that the power reception apparatus 12 has come near the power transmission apparatus 11.

The power transmission apparatus 11 is capable of recognizing the approach of the power reception apparatus 12 by, for example, performing polling and receiving a response to the polling from the power reception apparatus 12.

Also, the power transmission apparatus 11 is capable of recognizing the approach of the power reception apparatus 12 when the power reception apparatus 12 is placed on the power transmission apparatus 11 and thereby a mechanical switch provided on the power transmission apparatus 11 is pressed, or when the weight of the power reception apparatus 12 is sensed by a weight sensor.

Furthermore, transmission of power by the power transmission apparatus 11 can be started by, for example, a user operation of a switch or another trigger.

Just after the power transmission apparatus 11 has started transmitting power, the controller 45 of the power reception apparatus 12 (FIG. 7) controls the regulator 43, thereby stopping power supply to the load 44.

In step S12, the foreign matter detector 46 of the power reception apparatus 12 (FIG. 7) performs foreign matter detection by determining whether or not foreign matter exists by using the first detection method, before wireless power supply to the load 44 starts. Then, the process proceeds to step S13.

In step S13, the foreign matter detector 46 determines whether or not foreign matter has been detected by using the first detection method.

If it is determined in step S13 that foreign matter has been detected, the process proceeds to step S18, where the controller 45 of the power reception apparatus 12 (FIG. 7) controls the communication unit 42 so as to transmit a detection message indicating that foreign matter has been detected to the power transmission apparatus 11.

Furthermore, in step S18, the power transmission apparatus 11 receives the detection message from the power reception apparatus 12, and ends (stops) transmitting power in response to the detection message. That is, in the power transmission apparatus 11, the controller 24 controls the driver circuit 22 to stop transmission of power from the resonance circuit 20.

Subsequently, the process proceeds from step S18 to step S19, where at least one of the power transmission apparatus 11 and the power reception apparatus 12 notifies the user that foreign matter exists. Furthermore, if necessary, an abnormality notification process for requesting the user to remove the foreign matter (display of a message indicating that foreign matter exists or turning on of a lamp indicting that foreign matter exists) is performed, and the wireless power supply process ends.

On the other hand, if it is determined in step S13 that no foreign matter has been detected by using the first detection method, the process proceeds to step S14, where the controller 45 of the power reception apparatus 12 (FIG. 7) controls the regulator 43 to start power supply to the load 44. Then, the process proceeds to step S15.

In step S15, the foreign matter detector 46 of the power reception apparatus 12 (FIG. 7) performs foreign matter detection by determining whether or not foreign matter exists by using the second detection method. Then, the process proceeds to step S16.

In step S16, the foreign matter detector 46 determines whether or not foreign matter has been detected by using the second detection method.

If it is determined in step S16 that no foreign matter has been detected, the process returns to step S15, and the same process is repeated.

In this way, after power supply to the load 44 starts after it is determined that no foreign matter exists by using the first detection method, the foreign matter detector 46 performs foreign matter detection by using the second detection method, which is different from the first detection method, while power is being supplied to the load 44.

On the other hand, if it is determined in step S16 that foreign matter has been detected by using the second detection method, the process proceeds to step S17, where the controller 45 of the power reception apparatus 12 (FIG. 7) controls the regulator 43 to stop power supply to the load 44.

Then, the process returns from step S17 to step S12, and the same process is repeated.

In this way, if foreign matter is detected by using the second detection method, foreign matter detection is performed again by using the first detection method.

If no foreign matter is detected by using the first detection method, power supply to the load 44 is restarted in step S14.

On the other hand, if foreign matter is detected by using the first detection method, the power transmission apparatus 11 ends transmitting power in step S18, and an abnormality notification process is performed in step S19.

Here, a detection method in which the accuracy of detecting foreign matter is higher than the second detection method can be employed as the first detection method.

On the other hand, as the second detection method, a detection method with which foreign matter detection can be performed even when power is being supplied to the load 44, that is, even when power is being transmitted by the power transmission apparatus 11, can be employed. The accuracy of detecting foreign matter of the second detection method may be lower than that of the first detection method.

An example of the first detection method is the Q-value-based foreign matter detection method, and an example of the second detection method is the efficiency-based foreign matter detection method.

Figure 9:
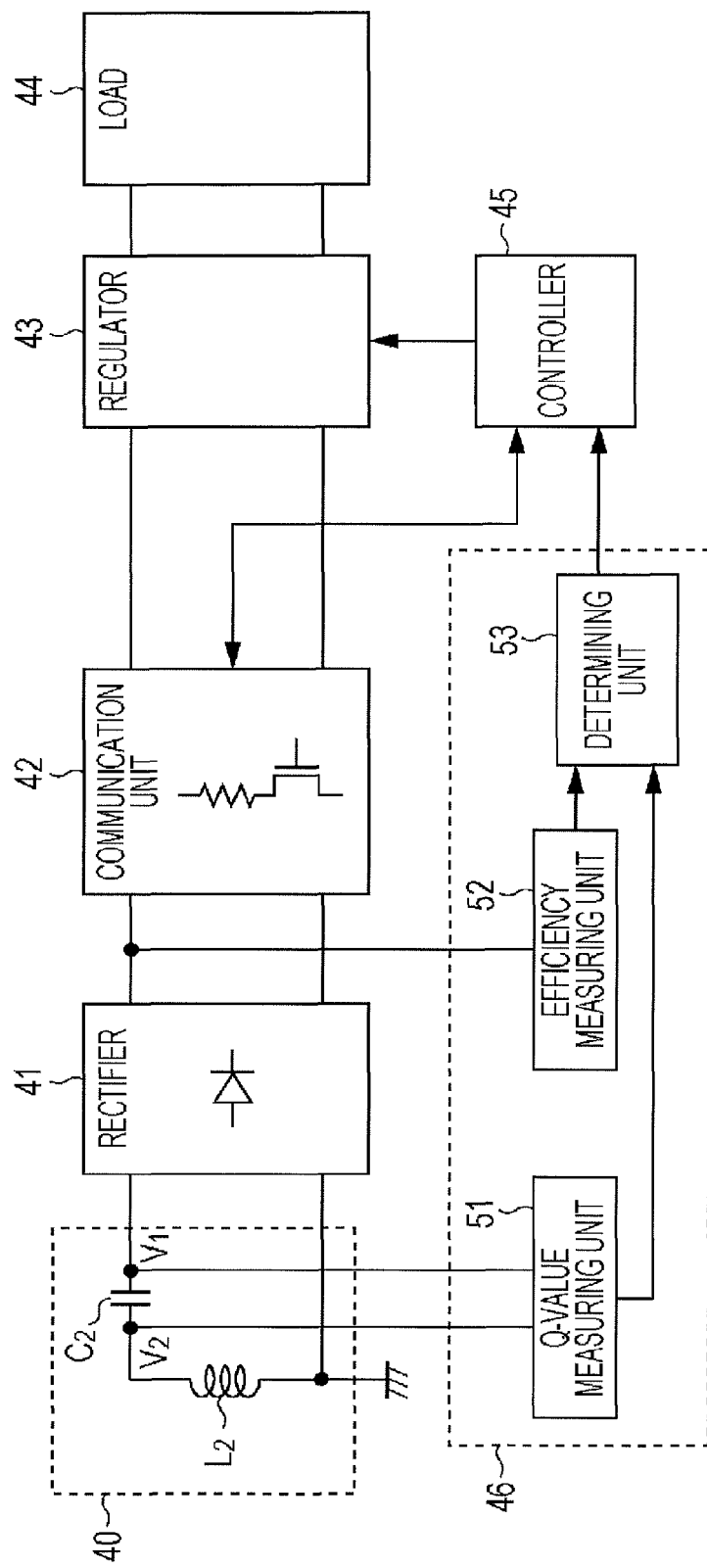
FIG. 9 is a block diagram illustrating an example configuration of a foreign matter detector.

FIG. 9 is a block diagram illustrating an example configuration of the foreign matter detector 46 illustrated in FIG. 7.

That is, FIG. 9 illustrates an example configuration of the foreign matter detector 46 in a case where the Q-value-based foreign matter detection method is used as the first detection method and the efficiency-based foreign matter detection method is used as the second detection method.

In FIG. 9, the foreign matter detector 46 includes a Q-value measuring unit 51, an efficiency measuring unit 52, and a determining unit 53.

The Q-value measuring unit 51 applies a certain voltage to the resonance circuit 40, which is constituted by the power reception coil $L_2$ and the capacitor $C_2$.

Furthermore, the Q-value measuring unit 51 measures a voltage $V_1$ applied to the resonance circuit 40, that is, voltage drop of the power reception coil $L_2$ and the capacitor $C_2$ which are connected in series, and a voltage $V_2$ applied to the power reception coil $L_2$, that is, voltage drop of the power reception coil $L_2$.

Also, the Q-value measuring unit 51 measures the Q-value of the power reception coil $L_2$ (the resonance circuit 40 including the power reception coil $L_2$ as an element) in accordance with equation (3) or (5) by using the voltages $V_1$ and $V_2$, and supplies the Q-value to the determining unit 53.

The efficiency measuring unit 52 measures the current and voltage on the output side of the rectifier 41 (the side on which rectified current and voltage are output), and obtains, by using the current and voltage, the value of DC power obtained by the power reception apparatus 12 through wireless power supply (hereinafter referred to as reception DC power).

Furthermore, the efficiency measuring unit 52 obtains the value of DC power used for wireless power supply by the power transmission apparatus 11 (hereinafter referred to as transmission DC power).

Here, the efficiency measuring unit 52 requests the value of transmission DC power to the controller 45 via the determining unit 53. The controller 45 controls the communication unit 42 in response to the request from the efficiency measuring unit 52, thereby transmitting a request message for requesting the value of transmission DC power to the power transmission apparatus 11 by using load modulation.

In the power transmission apparatus 11, the controller 24 (FIG. 5) receives the request message from the power reception apparatus 12 via the waveform detector 23, obtains the value of transmission DC power in accordance with the voltage and current of the DC power source 21 in response to the request message, and transmits the value of transmission DC power to the power reception apparatus 12.

Transmission of the value of transmission DC power from the power transmission apparatus 11 to the power reception apparatus 12 is performed by, for example, controlling the driver circuit 22 by the controller 24 to modulate the amplitude of the current flowing through the resonance circuit 20.

The efficiency measuring unit 52 calculates the ratio of the reception DC power to the transmission DC power, the ratio being regarded as power efficiency (DC-DC efficiency), and supplies the ratio to the determining unit 53.

The determining unit 53 performs foreign matter detection by determining, with the Q-value-based foreign matter detection method, whether or not foreign matter exists by using the Q-value of the power reception coil $L_2$ received from the Q-value measuring unit 51, and supplies the detection result to the controller 45.

That is, the determining unit 53 stores, in a memory provided therein (not illustrated), a threshold Q-value unique to the power reception apparatus 12, and performs a threshold process of comparing the Q-value of the power reception coil $L_2$ received from the Q-value measuring unit 51 with the threshold Q-value.

If the Q-value of the power reception coil $L_2$ is larger than the threshold Q-value, the determining unit 53 determines that no foreign matter exists. If the Q-value of the power reception coil $L_2$ is not larger than the threshold Q-value, the determining unit 53 determines that foreign matter exists.

Also, the determining unit 53 performs foreign matter detection by determining, with the efficiency-based foreign matter detection method, whether or not foreign matter exists by using the power efficiency received from the efficiency measuring unit 52 (hereinafter referred to as measured power efficiency), and supplies the detection result to the controller 45.

That is, the determining unit 53 performs a threshold process of comparing the measured power efficiency received from the efficiency measuring unit 52 with a certain threshold of power efficiency.

If the measured power efficiency is higher than the certain threshold, the determining unit 53 determines that no foreign matter exists. If the measured power efficiency is not higher than the certain threshold, the determining unit 53 determines that foreign matter exists.

Examples of the certain threshold used for the threshold process for measured power efficiency include a worst threshold and an appropriate threshold.

A worst threshold is preset to be a certain value under the assumption of a certain case. For example, measured power efficiency is inferred to be higher than or equal to the certain value as long as no foreign matter exists in the worst case of the allowance of displacement of (the power reception coil $L_2$ of) the power reception apparatus 12 (the case where a displacement is the maximum), but measured power efficiency is inferred to be lower than the certain value if foreign matter exists.

If the measured power efficiency is not higher than the worst threshold, a displacement may be beyond the allowance or foreign matter (almost) certainly exists.

An appropriate threshold may be a threshold of power efficiency which is appropriate for detecting foreign matter in the situation of the wireless power supply system when it is determined that no foreign matter exists by using the first detection method (hereinafter referred to as a system situation), and may be calculated with the Q-value-based foreign matter detection method by using the power efficiency which may be measured immediately after it is determined that no foreign matter exists.

Since the detection accuracy of the Q-value-based foreign matter detection method may be high, it is (almost) certainly ensured that no foreign matter exists immediately after it is determined that no foreign matter exists by using the Q-value-based foreign matter detection method.

Thus, the power efficiency which may be measured immediately after it is determined that no foreign matter exists by using the Q-value-based foreign matter detection method (hereinafter referred to as immediate efficiency) can be regarded as power efficiency which may be obtained when no foreign matter exists in a current displacement state. As long as the current displacement is maintained and as long as no foreign matter exists, it is less likely that the measured power efficiency obtained thereafter will be much lower than the immediate efficiency.

Accordingly, in this embodiment, the immediate efficiency may be used, and, for example, a value slightly smaller than the immediate efficiency may be calculated as an appropriate threshold.

For example, a value obtained by multiplying a certain value which may be smaller than one and approximate to one (for example, 0.9) by the immediate efficiency, or a value obtained by subtracting, from the immediate efficiency, a certain value (for example, 10%) determined based on fluctuation of power efficiency, which is inferred to occur regardless of presence/absence of foreign matter, in view of a certain margin, may be calculated as an appropriate threshold.

Regarding the efficiency-based foreign matter detection method, which is used as the second detection method, the determining unit 53 performs a threshold process using the above-described worst threshold (first threshold process) and a threshold process using the above-described appropriate threshold (second threshold process).

The values used as the worst threshold and the appropriate threshold are set so that foreign matter is invariably detected by using the appropriate threshold if foreign matter is detected by using the worst threshold.

For example, regarding the efficiency-based foreign matter detection method, the values of the worst threshold and the appropriate threshold are set so that the appropriate threshold is larger than or equal to the worst threshold. Thus, if the appropriate threshold which may be calculated on the basis of the immediate efficiency is smaller than the worst threshold, the appropriate threshold may be set to be the same value as the worst threshold.

Figure 10:
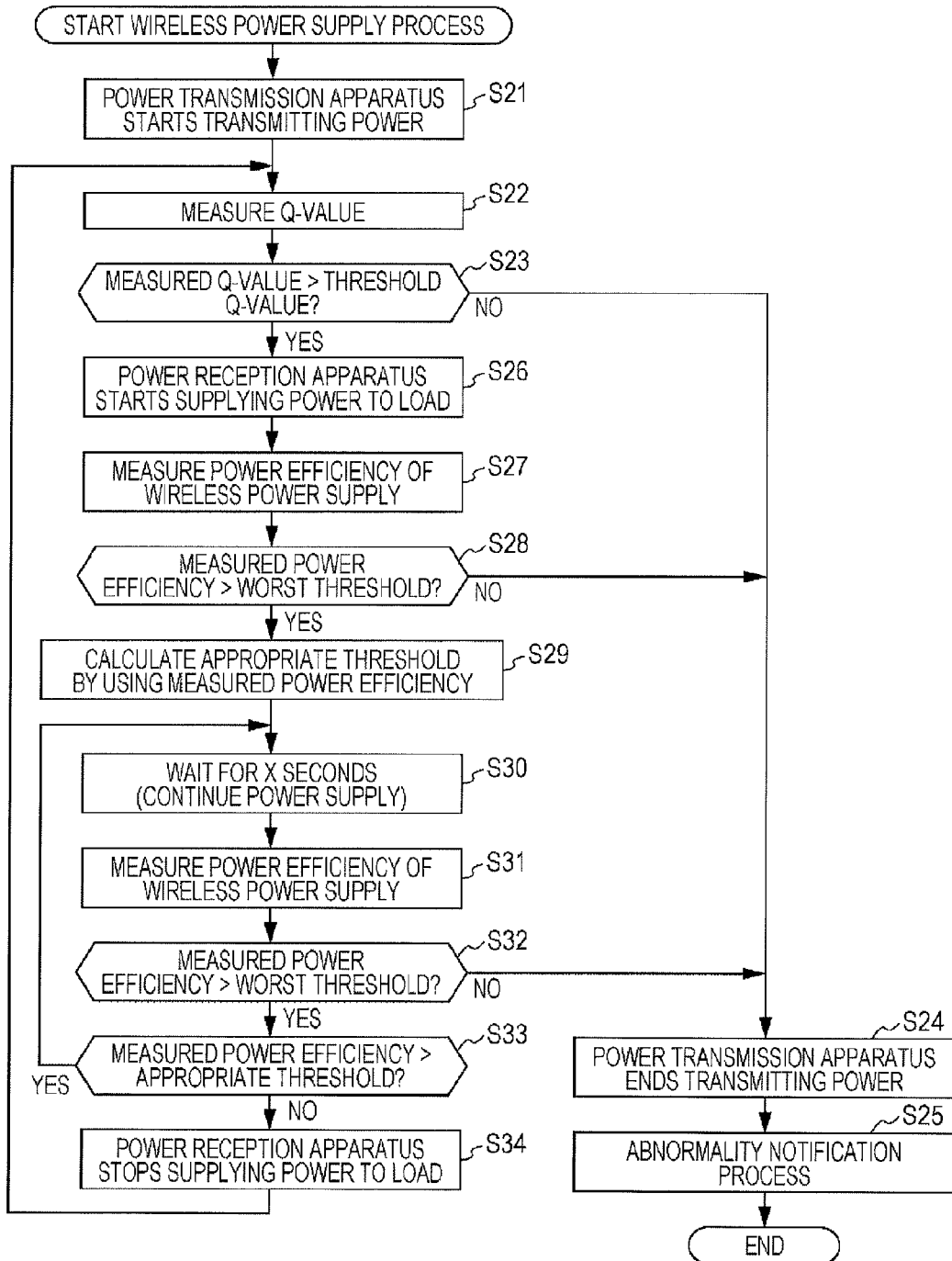
FIG. 10 is a flowchart describing a wireless power supply process performed in the wireless power supply system.

FIG. 10 is a flowchart describing a wireless power supply process performed in the wireless power supply system illustrated in FIG. 1 in a case where the foreign matter detector 46 has the configuration illustrated in FIG. 9.

That is, FIG. 10 is a flowchart describing a wireless power supply process in a case where the Q-value-based foreign matter detection method may be used as the first detection method and the efficiency-based foreign matter detection method may be used as the second detection method.

When the power reception apparatus 12 approaches the power transmission apparatus 11, the power transmission apparatus 11 starts transmitting power in step S21, as in step S11 in FIG. 8, and the process proceeds to step S22.

In step S22, before wireless power supply to the load 44 starts, the Q-value measuring unit 51 of the power reception apparatus 12 (FIG. 9) measures the Q-value of the power reception coil $L_2$ in order to perform foreign matter detection by using the Q-value-based foreign matter detection method, which is the first detection method.

Here, while the Q-value measuring unit 51 is measuring the Q-value of the power reception coil $L_2$ (measuring the voltages $V_1$ and $V_2$ necessary for obtaining the Q-value), the power transmission apparatus 11 temporarily stops transmitting power, as described above with reference to FIG. 4.

Measurement of the Q-value of the power reception coil $L_2$ in step S22 may be performed a plurality of times when the process returns from step S34 (described below) to step S22. In the m-th step S22, for example, the process of the m-th measurement of Q-values described above with reference to FIG. 4 is performed.

In any step S22, the process of the first measurement of Q-values described above with reference to FIG. 4 can be performed.

In step S22, the Q-value measuring unit 51 measures the Q-value of the power reception coil $L_2$, and supplies the Q-value obtained through the measurement (hereinafter referred to as measured Q-value) to the determining unit 53. Then, the process proceeds to step S23.

In step S23, the determining unit 53 determines whether or not foreign matter has been detected by using the measured Q-value received from the Q-value measuring unit 51, in accordance with the Q-value-based foreign matter detection method serving as the first detection method.

That is, in step S23, the determining unit 53 performs a threshold process of comparing the measured Q-value received from the Q-value measuring unit 51 with the threshold Q-value, and determines whether or not the measured Q-value is larger than the threshold Q-value.

If it is determined in step S23 that the measured Q-value is not larger than the threshold Q-value, the determining unit 53 determines that foreign matter exists, and supplies a detection result indicating that foreign matter has been detected to the controller 45 (FIG. 9). Then, the process proceeds to step S24.

In step S24, as in step S18 in FIG. 8, the power transmission apparatus 11 stops (ends) transmitting power.

That is, in step S24, the controller 45 of the power reception apparatus 12 controls the communication unit 42 to transmit a detection message indicating that foreign matter has been detected to the power transmission apparatus 11. Furthermore, in step S24, the power transmission apparatus 11 receives the detection message from the power reception apparatus 12, and ends transmitting power in response to the detection message.

Subsequently, the process proceeds from step S24 to step S25, where an abnormality notification process may be performed as in step S19 in FIG. 8, and then the wireless power supply process ends.

It is likely that foreign matter such as metal will be inserted between the power transmission apparatus 11 and the power reception apparatus 12 when the power reception apparatus 12 approaches the power transmission apparatus 11. Furthermore, the threshold used in the efficiency-based foreign matter detection method serving as the second detection method may be calculated on the basis of power efficiency in a state where no foreign matter exists. Thus, in the new detection method, foreign matter detection may be performed by using the Q-value-based foreign matter detection method, which is the first detection method and which realizes high detection accuracy, immediately after the power reception apparatus 12 approached the power transmission apparatus 11 and before power supply to the load 44 starts.

If it is determined in step S23 that the measured Q-value is larger than the threshold Q-value, the determining unit 53 determines that no foreign matter exists, and the process proceeds to step S26.

In step S26, the controller 45 of the power reception apparatus 12 (FIG. 9) controls the regulator 43 to start supplying power to the load 44.

That is, if it is ensured (with high possibility) that no foreign matter exists by using the Q-value-based foreign matter detection method which realizes high detection accuracy, power supply to the load 44 starts.

After power supply to the load 44 starts in step S26, the process proceeds to step S27, where the efficiency measuring unit 52 of the power reception apparatus 12 (FIG. 9) measures power efficiency in order to perform foreign matter detection by using the efficiency-based foreign matter detection method, which may be the second detection method.

In step S27, the efficiency measuring unit 52 measures power efficiency, and supplies the power efficiency obtained through the measurement (measured power efficiency) to the determining unit 53. Then, the process proceeds to step S28.

Here, when power efficiency is measured in step S27, it is ensured that, by the Q-value-based foreign matter detection method realizing high detection accuracy, no foreign matter exists.

Thus, if the power efficiency measured in step S27 is low (the value is small), it may be inferred that the displacement of (the power reception coil $L_2$ of) the power reception apparatus 12 with respect to (the power transmission coil $L_1$ of) the power transmission apparatus 11 is large. On the other hand, if the power efficiency measured in step S27 is high (the value is large), it may be inferred that the displacement of the power reception apparatus 12 with respect to the power transmission apparatus 11 is small.

In step S28, the determining unit 53 determines whether or not foreign matter has been detected by using the measured power efficiency received from the efficiency measuring unit 52, in accordance with the efficiency-based foreign matter detection method serving as the second detection method.

That is, in step S28, the determining unit 53 performs the first threshold process of comparing the measured power efficiency received from the efficiency measuring unit 52 with the worst threshold, and determines whether or not the measured power efficiency is higher than the worst threshold.

If it is determined in step S28 that the measured power efficiency is not higher than the worst threshold, the determining unit 53 determines that the displacement is beyond the allowance or that the displacement is within the allowance but an abnormal situation has occurred in which power efficiency may be unexpectedly low, and supplies a detection result indicating that foreign matter has been detected to the controller 45 (FIG. 9), as in the case where it is determined that foreign matter exists.

Then, the process proceeds from step S28 to step S24, and the above-described process may be repeated.

On the other hand, if it is determined in step S28 that the measured power efficiency is higher than the worst threshold, the process proceeds to step S29, where the determining unit 53 calculates an appropriate threshold of power efficiency by using the power efficiency measured in step S27 (measured power efficiency), that is, by multiplying a certain value by the measured power efficiency (immediate efficiency) or subtracting a certain value from the measured power efficiency. Then, the process proceeds to step S30.

Here, the threshold of power efficiency which may be used for the threshold process in the efficiency-based foreign matter detection method is typically determined so that, for example, foreign matter can be detected as highly accurately as possible while a certain displacement is allowed, by considering manufacturing variations of the power transmission apparatus 11 and the power reception apparatus 12 and an allowable displacement.

However, in the case of performing foreign matter detection by using the efficiency-based foreign matter detection method alone, the displacement which is considered to determine the threshold of power efficiency and the displacement which actually occurs do not match in many cases. Also, manufacturing variation which is considered to determine the threshold of power efficiency and actual manufacturing variation do not match in many cases.

Thus, in the case of performing foreign matter detection by using the efficiency-based foreign matter detection method alone, it may be difficult to determine a threshold which enables highly accurate detection of foreign matter.

In contrast, in the new detection method, an appropriate threshold may be calculated by using immediate efficiency, that is, the power efficiency which may be measured immediately after it is determined that no foreign matter exists by using the Q-value-based foreign matter detection method.

The immediate efficiency may be actual power efficiency which is obtained under a current displacement state when no foreign matter exists, and is thus regarded as power efficiency in which an actual displacement and actual manufacturing variation are reflected. As a result of calculating an appropriate threshold by using such immediate efficiency, the appropriate threshold in which an actual displacement and actual manufacturing variation are reflected can be obtained.

As a result, in a state of the displacement when the appropriate threshold is obtained, foreign matter can be detected highly accurately by using the appropriate threshold.

In step S30, the process waits for a certain time period (X seconds), and the process proceeds to step S31.

In step S31, as in step S27, the efficiency measuring unit 52 of the power reception apparatus 12 measures power efficiency, and supplies the power efficiency obtained through the measurement (measured power efficiency) to the determining unit 53. Then, the process proceeds to step S32.

In step S32, the determining unit 53 determines whether or not foreign matter has been detected by using the measured power efficiency received from the efficiency measuring unit 52, in accordance with the efficiency-based foreign matter detection method serving as the second detection method.

That is, in step S32, the determining unit 53 performs the first threshold process of comparing the measured power efficiency received from the efficiency measuring unit 52 with the worst threshold, and determines whether or not the measured power efficiency is higher than the worst threshold.

If it is determined in step S32 that the measured power efficiency is not higher than the worst threshold, the determining unit 53 supplies a detection result indicating that foreign matter has been detected to the controller 45.

Then, the process proceeds from step S32 to step S24, and the above-described process may be performed.

On the other hand, if it is determined in step S32 that the measured power efficiency is higher than the worst threshold, the process proceeds to step S33, where the determining unit 53 determines whether or not foreign matter has been detected by using the measured power efficiency received from the efficiency measuring unit 52, in accordance with the efficiency-based foreign matter detection method serving as the second detection method.

That is, in step S33, the determining unit 53 performs the second threshold process of comparing the measured power efficiency received from the efficiency measuring unit 52 with the appropriate threshold, and determines whether or not the measured power efficiency is higher than the appropriate threshold.

If it is determined in step S33 that the measured power efficiency is higher than the appropriate threshold, that is, if power efficiency of an appropriate value is obtained as power efficiency in the state of a displacement when immediate efficiency is measured, and if it is determined that no foreign matter exists, the process returns to step S30, and the same process may be repeated.

If it is determined in step S33 that the measured power efficiency is not higher than the appropriate threshold, that is, if low power efficiency is obtained as power efficiency in the state of a displacement when immediate efficiency is measured, and if it is determined that foreign matter exists or a displacement has changed (increased), the process proceeds to step S34, where the controller 45 of the power reception apparatus 12 controls the regulator 43 to stop supplying power to the load 44.

Then, the process returns from step S34 to step S22, and the above-described process may be repeated.

In the new detection method, after an appropriate threshold has been calculated, power efficiency may be regularly monitored with power being supplied to the load 44, and foreign matter detection may be performed in accordance with the efficiency-based foreign matter detection method by using the first threshold process using a worst threshold and the second threshold process using an appropriate threshold.

The appropriate threshold may be a threshold based on power efficiency in the state of a displacement when the immediate efficiency is measured. When the displacement becomes larger than that in a state where the immediate efficiency is measured, the power efficiency may become lower than the appropriated threshold due to the increased displacement.

If power supply from the power transmission apparatus 11 stops in a case where power efficiency becomes lower than the appropriate threshold due to an increased displacement but the displacement is within an allowance and where no foreign matter exists, usability may be degraded.

Therefore, in FIG. 10, if power efficiency is lower than the appropriate threshold, the process proceeds from step S33 to step S34, and the process returns to step S22, where foreign matter detection is performed by using the Q-value-based foreign matter detection method which realizes high detection accuracy.

If no foreign matter is detected by using the Q-value-based foreign matter detection method, power supply from the power transmission apparatus 1 1 may be continued (the process proceeds to step S26).

On the other hand, if foreign matter is detected by using the Q-value-based foreign matter detection method, power supply from the power transmission apparatus 11 ends (the process proceeds to step S24).

As described above, in the new detection method, whether or not foreign matter exists is determined by using the first detection method before power supply to the load 44 starts, and whether or not foreign matter exists is determined by using the second detection method, which is different from the first detection method, while power is being supplied to the load 44. In this way, foreign matter detection is performed.

Furthermore, in the new detection method, the Q-value-based foreign matter detection method, which realizes higher detection accuracy than the efficiency-based foreign matter detection method serving as the second detection method, may be used as the first detection method. Also, an appropriate threshold may be calculated by using immediate efficiency, which is the power efficiency measured immediately after it is determined that no foreign matter exists by using the Q-value-based foreign matter detection method.

Thus, before power supply to the load 44 starts, foreign matter detection can be performed with high accuracy by using the Q-value-based foreign matter detection method which realizes high detection accuracy. While power is being supplied to the load 44, foreign matter detection can be performed with relatively high accuracy by using the efficiency-based foreign matter detection method using an appropriate threshold (second threshold process).

With the efficiency-based foreign matter detection method (using an appropriate threshold), whether or not foreign matter exists can be determined even while power is being supplied to the load 44. Accordingly, temporal efficiency of wireless power supply can be increased, compared to the case of using the Q-value-based foreign matter detection method alone, in which it is necessary to stop transmission of power from the power transmission apparatus 11 (and power supply to the load 44) during measurement of a Q-value.

Furthermore, in the efficiency-based foreign matter detection method using an appropriate threshold, if it is determined that foreign matter exists, that is, if measured power efficiency decreases to under the appropriate threshold, there is a probability that a displacement has increased. In such a case, foreign matter detection may be performed again by using the Q-value-based foreign matter detection method. If no foreign matter is detected by using the Q-value-based foreign matter detection method, power supply from the power transmission apparatus 11 continues. Accordingly, it can be prevented that power supply from the power transmission apparatus 11 ends when power efficiency becomes lower than the appropriate threshold due to a large displacement within an allowance, and that usability may be degraded.

As described above, according to the new detection method, foreign matter detection can be performed with high accuracy and wireless power supply can be efficiently performed without causing degradation of usability.

The determining unit 53 illustrated in FIG. 9 may be provided in the power transmission apparatus 11, instead of the power reception apparatus 12. In this case, the Q-value of the power reception coil $L_2$ and the threshold Q-value, and the value of reception DC power which is used for calculating power efficiency are transmitted from the power reception apparatus 12 to the power transmission apparatus 11. Then, the determining unit 53 of the power transmission apparatus 11 determines whether or not foreign matter exists by using the Q-value received from the power reception apparatus 12 and the power efficiency calculated by using the value of reception DC power.

Then, a determination result indicating whether or not foreign matter exists is transmitted from the power transmission apparatus 11 to the power reception apparatus 12. In the power reception apparatus 12, power supply from the regulator 43 to the load 44 may be controlled in accordance with the determination result received from the power transmission apparatus 11.

As described above, the method for sharing the foreign matter detection function by the power transmission apparatus 11 and the power reception apparatus 12 is not limited.

Note that, in a case where the power reception apparatus 12 is operated by power which is wirelessly supplied from the power transmission apparatus 11 or power of a battery or the like charged with the power, it may be desirable that the power consumed by the foreign matter detection function in the power reception apparatus 12 below. From this point of view, it may be desirable that the burden of the foreign matter detection function imposed on the power reception apparatus 12 be small.

Therefore, the power reception apparatus 12 may perform processes which can be performed only by the power reception apparatus 12, for example, measurement of voltages $V_1$ and $V_2$ which are necessary to calculate the Q-value of the power reception coil $L_2$, and measurement of reception DC power which is used to calculate power efficiency. On the other hand, the power transmission apparatus 11 may perform calculation of the Q-value using the voltages $V_1$ and $V_2$, calculation of power efficiency using the reception DC power, and other processes necessary for the foreign matter detection function.

V. Calculation of Appropriate Threshold

FIG. 11 is a diagram describing calculation of an appropriate threshold.

That is, FIG. 11 illustrates an example of calculating a threshold used in a case where the efficiency-based foreign matter detection method may be used alone and an appropriate threshold used in (the efficiency-based foreign matter detection method performed in) the new detection method.

In FIG. 11, the maximum value of power efficiency (maximum efficiency value) may be 90%, and the maximum variation of power efficiency caused by a displacement within an allowance (positional-relationship variation width) may be 30%.

Also, in FIG. 11, the maximum variation of power efficiency caused by manufacturing variation (manufacturing variation width) may be 15%, and the maximum variation of power efficiency caused by a measurement error of power efficiency (measurement variation width) may be 5%.

In FIG. 11, power efficiency fluctuates by 50% (=30%+15%+5%) at maximum due to a displacement, manufacturing variation, and a measurement error. Thus, in FIG. 11, the worst threshold may be 50% of the maximum efficiency value (maximum efficiency value×0.5=45%).

In a case where the efficiency-based foreign matter detection method may be used alone, a value in which a displacement, manufacturing variation, and a measurement error are reflected can be obtained as power efficiency which is actually measured (efficiency value in an actual usage situation).

However, in a case where the efficiency-based foreign matter detection method may be used alone and where the power efficiency actually measured is low, it may be difficult to determine whether the cause of the low power efficiency is a displacement or the existence of foreign matter.

Thus, in a case where the efficiency-based foreign matter detection method may be used alone and where priority is placed on usability, a worst threshold can be used as a threshold with which power efficiency is compared.

In this case, as long as the power efficiency is not under the worst threshold, that is, the maximum efficiency value× 0.5=45%, it is not determined that foreign matter exists. Thus, in a case where the efficiency-based foreign matter detection method may be used alone and where the power efficiency is not under the worst threshold because displacement hardly occurs, it may be determined that no foreign matter exists even if foreign matter actually exists.

On the other hand, in the new detection method, the power efficiency which is actually measured (efficiency value in an actual usage situation) may be the power efficiency which is measured immediately after it is determined that no foreign matter exists by using the Q-value-based foreign matter detection method (immediate efficiency).

A displacement, manufacturing variation, and a measurement error are reflected in the immediate efficiency. Furthermore, it may be ensured that no foreign matter exists. Thus, if the displacement is maintained, the power efficiency which is measured thereafter is not much lower than the immediate efficiency, as long as foreign matter is not inserted.

In the new detection method, the immediate efficiency may be used. For example, a value obtained by multiplying a certain value by the immediate efficiency may be calculated as an appropriate threshold.

In FIG. 11, a value of 80% may be obtained as the immediate efficiency, for example. Also, a value of 72% may be obtained as the appropriate threshold by multiplying a certain value, for example, 0.9, by 80%.

According to the new detection method, when the power efficiency becomes under 45%, which may be the worst threshold, it is determined that foreign matter exists, and power supply stops.

When the power efficiency is not under 45%, which may be the worst threshold, but may be under 72%, which may be the appropriate threshold, it is determined that foreign matter may exist or a displacement has become larger, and it is determined whether or not foreign matter exists by using the Q-value-based foreign matter detection method which realizes higher detection accuracy than the efficiency-based foreign matter detection method.

Thus, according to the new detection method, merely an increase in displacement and a decrease in power efficiency to under an appropriate threshold does not cause stop of power supply. Accordingly, wireless power supply can be efficiently performed with usability being ensured.

According to the new detection method, if power efficiency becomes lower than an appropriate threshold due to the existence of foreign matter, the foreign matter may be detected by using the Q-value-based foreign matter detection method which realizes high detection accuracy, and power supply may be stopped.

Here, as the second detection method among the first and second detection methods used in the new detection method, a detection method for determining whether or not foreign matter exists by measuring a certain physical amount and performing a threshold process of comparing the measured value of the physical amount with a certain threshold, such as the efficiency-based foreign matter detection method, can be employed.

In the new detection method, an appropriate threshold which may be used for the threshold process in the second detection method can be calculated (determined) by using a measured value in the second detection method which is measured immediately after it is determined that no foreign matter exists (hereinafter referred to as an immediate measured value), by using the first detection method.

Calculation of an appropriate threshold using an immediate measured value can be performed by manipulating the immediate measured value, for example, with multiplication, addition, or subtraction of a certain value with respect to the immediate measured value. The degree of the manipulation can be determined on the basis of the maximum variation of a measured value (measurement variation width) caused by an error which occurs when a measured value is obtained by using the second detection method (measurement error).

That is, the degree of manipulation of an immediate measured value, specifically, a certain value which may be multiplied by or added to the immediate measured value, can be determined so that, for example, the immediate measured value matches the appropriate threshold with a margin of about twice the measurement variation width.

VI. Charging with Wireless Power Supply

FIG. 12 is a flowchart describing a process performed in the wireless power supply system illustrated in FIG. 1 in a case where charging may be performed by using wireless power supply.

In a case where charging is performed by using wireless power supply in the wireless power supply system, the load 44 of the power reception apparatus 12 (FIG. 9) includes a battery, and the battery may be charged.

Referring to FIG. 12, in steps S41 to S54, a process similar to that in steps S21 to S34 in FIG. 10 may be performed.

In step S49, as in step S29 in FIG. 10, the determining unit 53 calculates an appropriate threshold by using immediate efficiency. Then, the process proceeds to step S61, where the controller 45 of the power reception apparatus 12 (FIG. 9) determines whether or not the battery included in the load 44 is in a fully-charged state.

If it is determined in step S61 that the battery included in the load 44 is not in a fully-charged state, the process proceeds to step S50. In steps S50 to S54, a process similar to that in steps S30 to S34 in FIG. 10 may be performed.

If it is determined in step S61 that the battery included in the load 44 is in a fully-charged state, the process proceeds to step S62. In step S62, the controller 45 of the power reception apparatus 12 controls the communication unit 42, so as to transmit a completion message indicating that charging has been completed to the power transmission apparatus 11.

Also, in step S62, the power transmission apparatus 11 receives the completion message from the power reception apparatus 12, and ends (stops) transmitting power in response to the completion message.

Subsequently, the process proceeds from step S62 to step S63, where at least one of the power transmission apparatus 11 and the power reception apparatus 12 performs a charging completion process to notify a user that charging has been completed (for example, turns on a lamp indicating that charging has been completed). Then, the process ends.

VII. Another Example Configuration of Foreign Matter Detector 46

Figure 13:
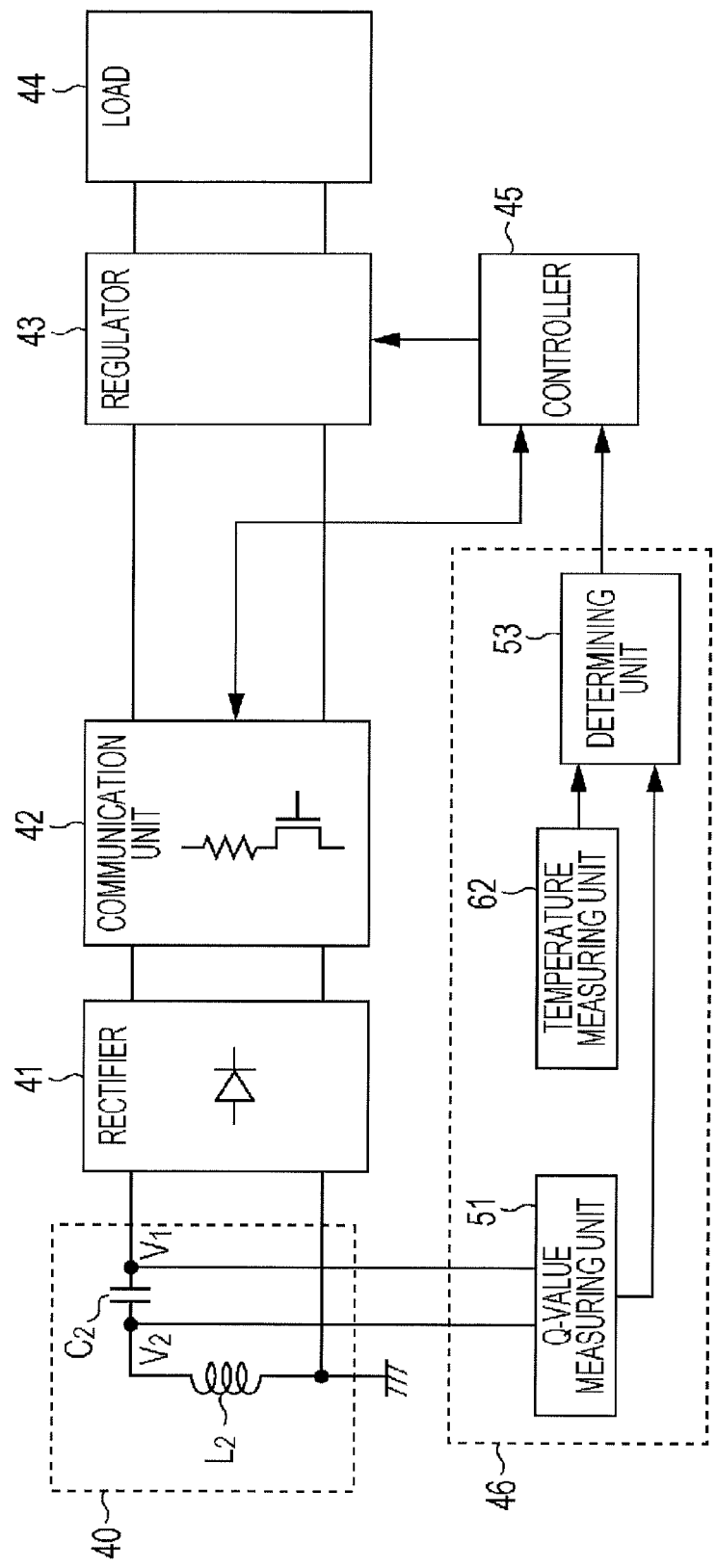
FIG. 13 is a block diagram illustrating another example configuration of the foreign matter detector.

FIG. 13 is a block diagram illustrating another example configuration of the foreign matter detector 46 illustrated in FIG. 7.

In FIG. 13, the parts corresponding to those in FIG. 9 are denoted by the same reference numerals, and the corresponding description is omitted as appropriate.

Referring to FIG. 13, the foreign matter detector 46 may be the same as that in FIG. 9 in that the Q-value measuring unit 51 and the determining unit 53 are provided.

However, the foreign matter detector 46 in FIG. 13 may be different from that in FIG. 9 in that a temperature measuring unit 62 may be provided instead of the efficiency measuring unit 52.

In the foreign matter detector 46 in FIG. 13, the Q-value-based foreign matter detection method may be used as the first detection method, as in FIG. 9. However, the temperature-based foreign matter detection method may be used as the second detection method, unlike in FIG. 9.

Thus, the foreign matter detector 46 in FIG. 13 includes the temperature measuring unit 62 instead of the efficiency measuring unit 52 in FIG. 9.

The temperature measuring unit 62 includes a temperature sensor (not illustrated), such as a thermistor, measures the temperature near the power reception coil $L_2$, for example, and supplies the temperature to the determining unit 53.

The determining unit 53 performs a process similar to the process performed by the determining unit 53 in FIG. 9, except for using the temperature supplied from the temperature measuring unit 62.

Figure 14:
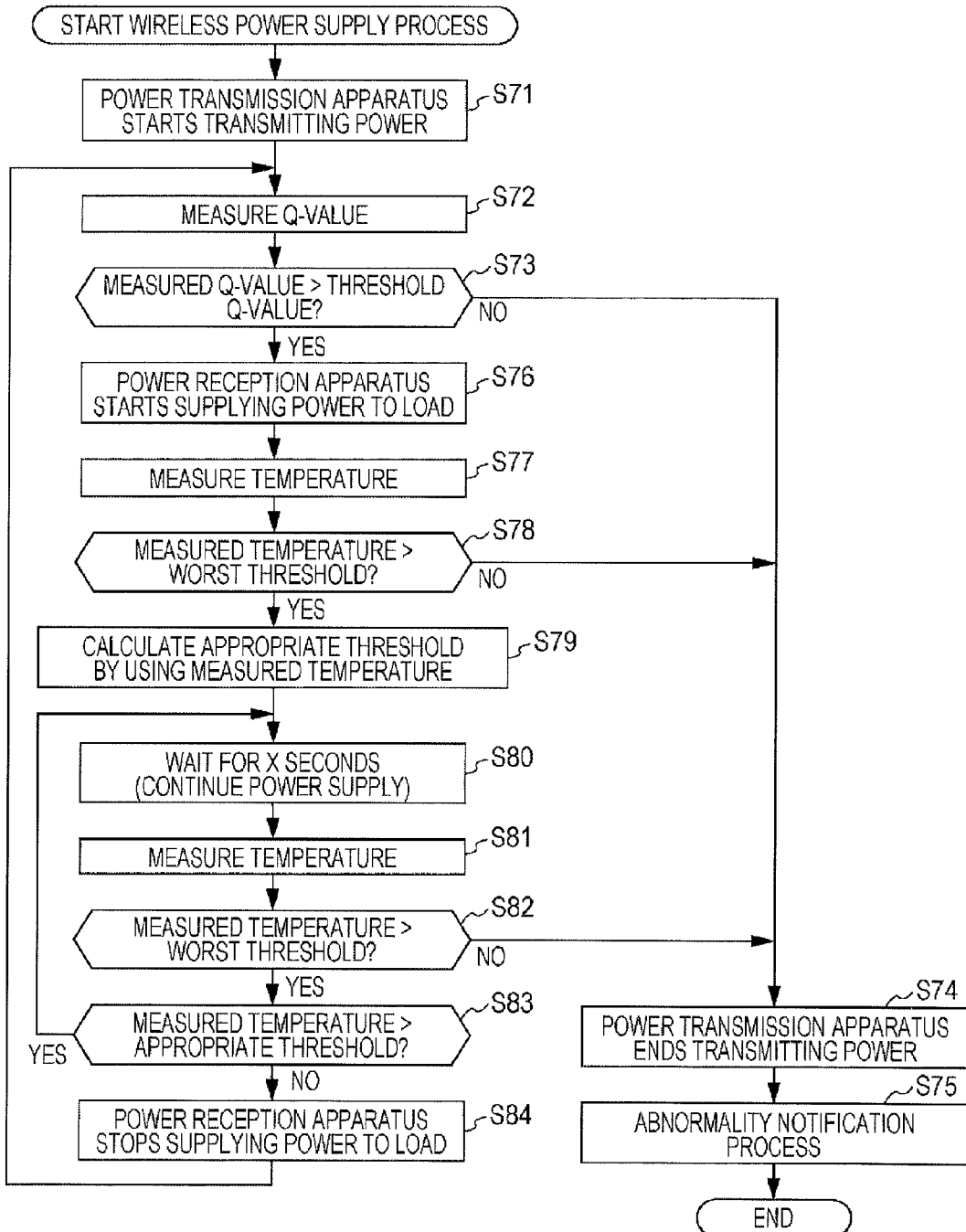
FIG. 14 is a flowchart describing a wireless power supply process performed in the wireless power supply system.

FIG. 14 is a flowchart describing a wireless power supply process performed in the wireless power supply system illustrated in FIG. 1 in a case where the foreign matter detector 46 has the configuration illustrated in FIG. 13.

That is, FIG. 14 is a flowchart describing a wireless power supply process in a case where the Q-value-based foreign matter detection method is used as the first detection method and the temperature-based foreign matter detection method is used as the second detection method.

When the power reception apparatus 12 approaches the power transmission apparatus 11, the power transmission apparatus 11 starts transmitting power in step S71, as in step S21 in FIG. 10, and the process proceeds to step S72.

In step S72, the Q-value measuring unit 51 of the power reception apparatus 12 (FIG. 13) measures the Q-value of the power reception coil $L_2$, as in step S22 in FIG. 10.

After measuring the Q-value of the power reception coil $L_2$, the Q-value measuring unit 51 supplies the Q-value obtained through the measurement (measured Q-value) to the determining unit 53, and the process proceeds to step S73.

In step S73, as in step S23 in FIG. 10, the determining unit 53 performs a threshold process of comparing the measured Q-value received from the Q-value measuring unit 51 with the threshold Q-value, and determines whether or not the measured Q-value is larger than the threshold Q-value.

If it is determined in step S73 that the measured Q-value is not larger than the threshold Q-value, the determining unit 53 determines that foreign matter exists, and supplies a detection result indicating that foreign matter has been detected to the controller 45 (FIG. 13). Then, the process proceeds to step S74.

In step S74, the power transmission apparatus 11 stops (ends) transmitting power, as in step S24 in FIG. 10.

Subsequently, the process proceeds from step S74 to step S75, where an abnormality notification process may be performed as in step S25 in FIG. 10, and the wireless power supply process ends.

On the other hand, if it is determined in step S73 that the measured Q-value is larger than the threshold Q-value, the determining unit 53 determines that no foreign matter exists, and the process proceeds to step S76.

In step S76, the controller 45 of the power reception apparatus 12 (FIG. 13) controls the regulator 43 to start power supply to the load 44.

After power supply to the load 44 is started in step S76, the process proceeds to step S77, where the temperature measuring unit 62 of the power reception apparatus 12 (FIG. 13) measures a temperature in order to perform foreign matter detection by using the temperature-based foreign matter detection method serving as the second detection method.

In step S77, after measuring temperature, the temperature measuring unit 62 supplies the temperature obtained through the measurement (hereinafter referred to as measured temperature) to the determining unit 53, and the process proceeds to step S78.

In step S78, the determining unit 53 determines whether or not foreign matter has been detected by using the measured temperature received from the temperature measuring unit 62, in accordance with the temperature-based foreign matter detection method serving as the second detection method.

That is, in step S78, the determining unit 53 performs a first threshold process of comparing the measured temperature received from the temperature measuring unit 62 with a worst threshold, and determines whether or not the measured temperature is lower than the worst threshold.

Here, as the worst threshold for the temperature-based foreign matter detection method, a minimum value (for example, 60 degrees) indicating that foreign matter (almost) certainly exists is set.

If it is determined in step S78 that the measured temperature is not lower than the worst threshold, the determining unit 53 determines that an abnormal situation has occurred in which a temperature is unexpectedly high, and supplies a detection result indicating that foreign matter has been detected to the controller 45 (FIG. 13), as in the case where it is determined that foreign matter exists.

Then, the process proceeds from step S78 to step S74, and the above-described process may be performed.

On the other hand, if it is determined in step S78 that the measured temperature is lower than the worst threshold, the process proceeds to step S79, where the determining unit 53 calculates an appropriate threshold by using the measured temperature which may be obtained in step S77 and at which it may be ensured that no foreign matter exists in the Q-value-based foreign matter detection method (hereinafter referred to as immediate temperature). The appropriate threshold may be calculated by multiplying or adding a certain value, which may be determined on the basis of a measurement variation width, by or to the immediate temperature (for example, by adding ten degrees to the immediate temperature). Then, the process proceeds to step S80.

In step S80, the process waits for a certain time period (X seconds), and the process proceeds to step S81.

In step S81, the temperature measuring unit 62 of the power reception apparatus 12 measures temperature, as in step S77, and supplies the temperature obtained through the measurement (measured temperature) to the determining unit 53. Then, the process proceeds to step S82.

In step S82, the determining unit 53 determines whether or not foreign matter has been detected by using the measured temperature received from the temperature measuring unit 62, in accordance with the temperature-based foreign matter detection method serving as the second detection method.

That is, in step S82, the determining unit 53 performs a first threshold process of comparing the measured temperature received from the temperature measuring unit 62 with the worst threshold, and determines whether or not the measured temperature is lower than the worst threshold.

If it is determined in step S82 that the measured temperature is not lower than the worst threshold, the determining unit 53 supplies a detection result indicating that foreign matter has been detected to the controller 45.

Then, the process proceeds from step S82 to step S74, and the above-described process may be performed.

On the other hand, if it is determined in step S82 that the measured temperature is lower than the worst threshold, the process proceeds to step S83, where the determining unit 53 determines whether or not foreign matter has been detected by using the measured temperature received from the temperature measuring unit 62, in accordance with the temperature-based foreign matter detection method serving as the second detection method.

That is, in step S83, the determining unit 53 performs a second threshold process of comparing the measured temperature received from the temperature measuring unit 62 with the appropriate threshold, and determines whether or not the measured temperature is lower than the appropriate threshold.

If it is determined in step S82 that the measured temperature is lower than the appropriate threshold, that is, if a temperature that is about the same as the immediate temperature is measured and thus it may be determined that no foreign matter exists, the process returns to step S80, and the above-described process may be repeated.

If it is determined in step S82 that the measured temperature is not lower than the appropriate threshold, that is, if a temperature higher than the immediate temperature is measured and thus there is a probability that foreign matter exists, the process proceeds to step S84, where the controller 45 of the power reception apparatus 12 controls the regulator 43 to stop power supply to the load 44.

Then, the process returns from step S84 to step S72, and the above-described process may be repeated.

As described above, in the new detection method in which the Q-value-based foreign matter detection method may be used as the first detection method and the temperature-based foreign matter detection method may be used as the second detection method, after an appropriate threshold has been calculated, temperatures are regularly monitored with power being supplied to the load 44, and foreign matter detection with the temperature-based foreign matter detection method may be performed by using a first threshold process using a worst threshold and a second threshold process using the appropriate threshold.

The measured temperature varies depending on a condition in which a temperature sensor serving as the temperature measuring unit 62 is placed and is in contact with another device, a state of a room in which the wireless power supply system is placed (the temperature of the room in which the wireless power supply system is placed), and other conditions of the wireless power supply system.

Therefore, if a low temperature is set as a worst threshold and if the room temperature is high, a measured temperature may be higher than the worst threshold even if no foreign matter exists. In this case, it is wrongly determined that foreign matter exists, power supply is stopped, and usability may be degraded.

To ensure usability, a relatively large value which will be higher than a measured temperature even when a room temperature is high and which will be lower than measured temperature when foreign matter exists (for example, 60 degrees) can be set as a worst threshold.

However, merely performing a threshold process using such a worst threshold may be insufficient to detect foreign matter in a case where foreign matter actually exists but a measured temperature is lower than the worst threshold due to a low room temperature. Accordingly, the accuracy of detecting foreign matter decreases.

In the new detection method in which the Q-value-based foreign matter detection method may be used as the first detection method and the temperature-based foreign matter detection method may be used as the second detection method, an appropriate threshold may be set on the basis of immediate temperature, which may be a measured temperature at which it may be ensured that no foreign matter exists by using the Q-value-based foreign matter detection method, and, if a measured temperature is higher than the appropriated threshold, foreign matter detection may be performed by using the Q-value-based foreign matter detection method which realizes high detection accuracy. Thus, foreign matter detection can be performed with high accuracy and wireless power supply can be efficiently performed without causing degradation of usability.

In the new detection method, it may be desirable that the detection accuracy of the first detection method be as high as possible.

Furthermore, in the new detection method, it may be determined whether or not foreign matter exists by using the first detection method before power supply to the load 44 starts. Thus, a detection method with which foreign matter detection can be performed when power supply to the load 44 is not being performed, that is, when power transmission by the power transmission apparatus 11 is not being performed, can be used as the first detection method.

In the new detection method, when power supply to the load 44 is being performed, it may be determined whether or not foreign matter exists by using the second detection method. Thus, it is necessary to use, as the second detection method, a detection method with which foreign matter detection can be performed even when power supply to the load 44 is being performed, that is, when power transmission by the power transmission apparatus 11 may be being performed.

Thus, as well as the Q-value-based foreign matter detection method, the above-described light-based foreign matter detection method, image-based foreign matter detection method, effective-resistance-based foreign matter detection method, or the like can be used as the first detection method.

The light-based foreign matter detection method and the image-based foreign matter detection method may be disadvantageous in terms of cost, mounting area, and so forth, compared to the Q-value-based foreign matter detection method. However, the light-based foreign matter detection method and the image-based foreign matter detection method have characteristics similar to those of the Q-value-based foreign matter detection method in that the detection accuracy may be relatively high and power transmission (wireless power supply) using a magnetic field by the power transmission apparatus 11 exerts an influence as noise, and in that it may be desirable to avoid the constant use as much as possible in terms of power consumption.

On the other hand, as the second detection method, the above-described load-based foreign matter detection method can be used as well as the efficiency-based foreign matter detection method and the temperature-based foreign matter detection method.

In the configuration illustrated in FIG. 7, the connection of the resistor may be turned ON/OFF in the communication unit 42 of the power reception apparatus 12, and thereby load modulation may be performed to transmit information from the power reception apparatus 12 to the power transmission apparatus 11. However, the communication method used for the communication between the power transmission apparatus 11 and the power reception apparatus 12 is not limited thereto.

VIII. Other Example Configurations of Power Reception Apparatus 12

Figure 15A:
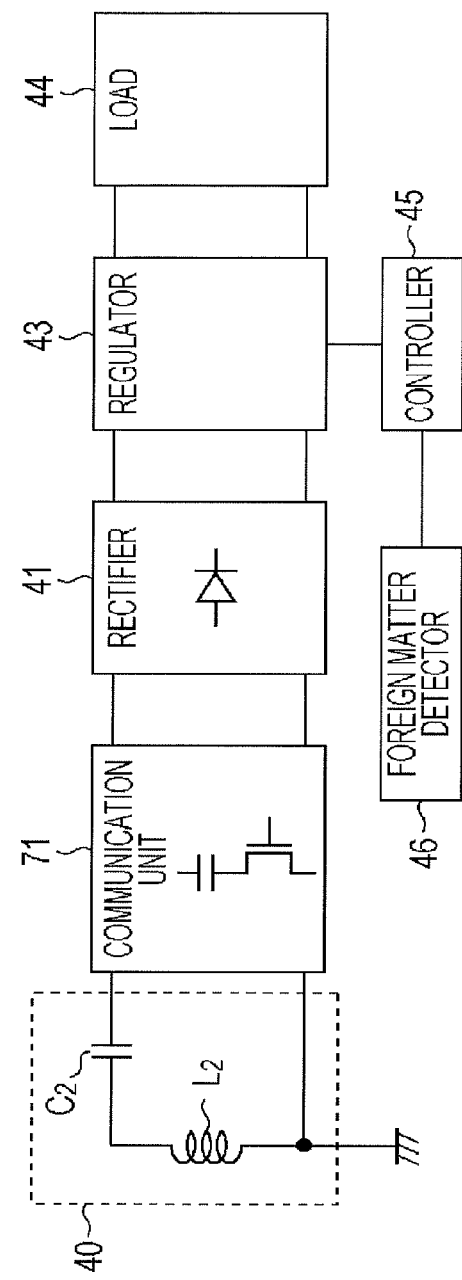
FIG. 15A is a block diagram illustrating another example configuration of the power reception apparatus.
Figure 15B:
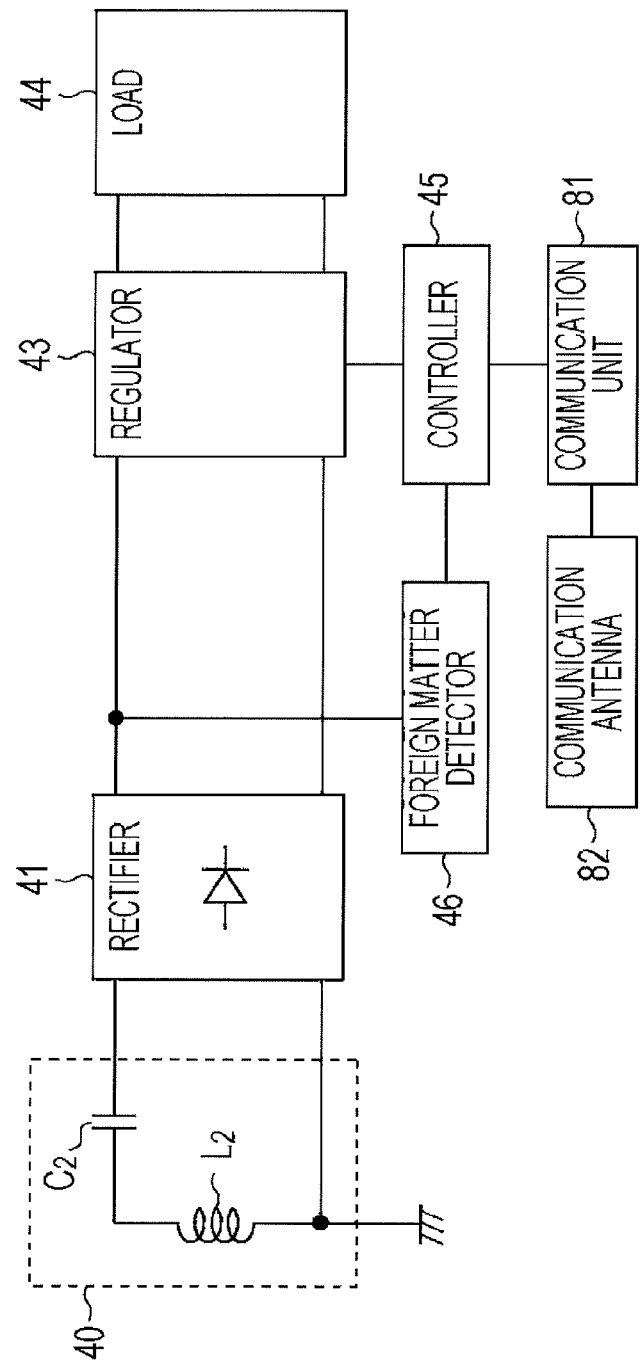
FIG. 15B is a block diagram illustrating another example configuration of the power reception apparatus.

FIGS. 15A and 15B are block diagrams illustrating other example configurations of the power reception apparatus 12 illustrated in FIG. 1.

In FIGS. 15A and 15B, the parts corresponding to those in FIG. 7 are denoted by the same reference numerals, and the corresponding description is omitted.

The power reception apparatus 12 in FIG. 15A may be the same as that in FIG. 7 in that the resonance circuit 40, the rectifier 41, the regulator 43, the load 44, the controller 45, and the foreign matter detector 46 are provided.

However, the power reception apparatus 12 in FIG. 15A may be different from that in FIG. 7 in that a communication unit 71 may be provided instead of the communication unit 42.

In FIG. 15A, the communication unit 71 may be provided between the resonance circuit 40 and the rectifier 41.

The communication unit 42 in FIG. 7 includes an FET and a resistor. In contrast, the communication unit 71 includes, for example, an FET and a capacitor. The FET may be turned ON/OFF in accordance with the control performed by the controller 45, so that the capacitor may be connected to or disconnected from the resonance circuit 40.

When the capacitor is connected to or disconnected from the resonance circuit 40, the impedance of the resonance circuit 40 as a load viewed from the (external) power transmission apparatus 11 changes, and load modulation may be performed on the current (voltage) in the resonance circuit 20 of the power transmission apparatus 11 (FIG. 5).

The power reception apparatus 12 in FIG. 15B may be the same as that in FIG. 7 in that the resonance circuit 40, the rectifier 41, the regulator 43, the load 44, the controller 45, and the foreign matter detector 46 are provided.

However, the power reception apparatus 12 in FIG. 15B may be different from that in FIG. 7 in that a communication unit 81 and a communication antenna 82 are provided instead of the communication unit 42.

The communication unit 81 performs wireless communication in accordance with, for example, ZigBee (registered trademark), Bluetooth (registered trademark), wireless local area network (LAN), or another communication scheme, when the communication antenna 82 transmits and receives radio waves.

In a case where the communication unit 81 is provided in the power reception apparatus 12, it may be necessary to provide a block capable of communicating with the communication unit 81 in the power transmission apparatus 11.

IX. Description of Computer to which Present Technology May be Applied

Among the processes related to the foreign matter detection function, at least some processes performed by the controller 24 of the power transmission apparatus 11 and the controller 45 and the determining unit 53 of the power reception apparatus 12 may be performed by hardware or software. When the processes are performed by software, a program constituting the software may be installed into a computer (processor).

Figure 16:
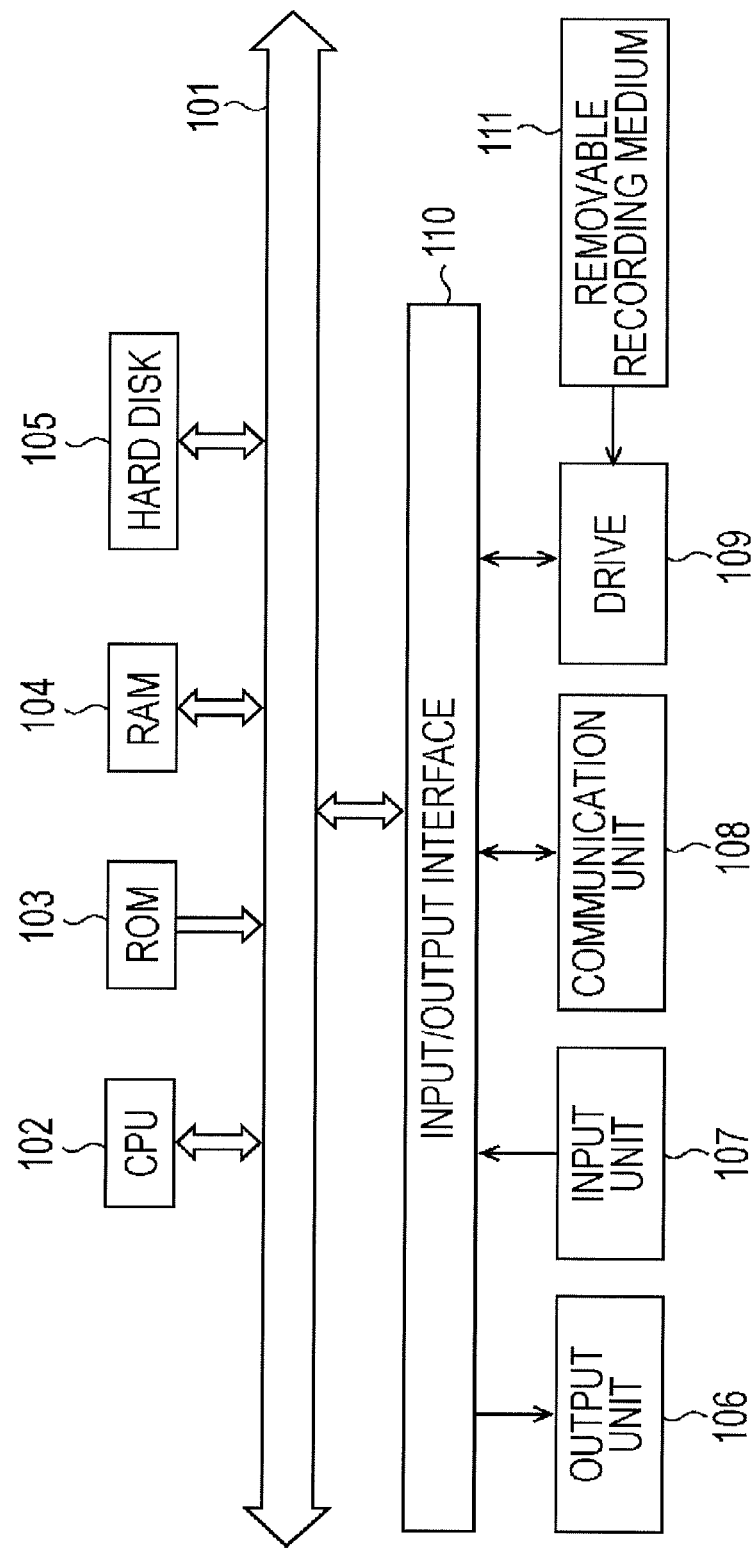
FIG. 16 is a block diagram illustrating an example configuration of a computer according to an embodiment of the present technology.

FIG. 16 illustrates an example configuration of a computer into which the program for executing the processes is installed according to an embodiment.

The program may be recorded in advance on a hard disk 105 or a read only memory (ROM) 103 serving as a recording medium included in the computer.

Alternatively, the program may be stored in (recorded on) a removable recording medium 111. The removable recording medium 111 may be provided as so-called packaged software. Examples of the removable recording medium 111 include a flexible disk, a compact disc read only memory (CD-ROM), a magneto-optical (MO) disc, a digital versatile disc (DVD), a magnetic disk, and a semiconductor memory.

The program may be installed from the above-described removable recording medium 111 to the computer, or may be downloaded to the computer via a communication network or a broadcast network and installed into the hard disk 105. That is, the program may be wirelessly transferred from a download site to the computer via an artificial satellite for digital satellite broadcasting, or may be transferred to the computer in a wired manner via a network, such as a LAN or the Internet.

The computer includes a central processing unit (CPU) 102. The CPU 102 may be connected to an input/output interface 110 via a bus 101.

Upon receiving an instruction from a user via the input/output interface 110 in accordance with an operation performed on an input unit 107, the CPU 102 executes the program stored in the ROM 103 in response to the instruction. Alternatively, the CPU 102 executes the program stored in the hard disk 105 by loading it to a random access memory (RAM) 104.

Accordingly, the CPU 102 executes a process in accordance with the above-described flowcharts or a process performed by the configuration illustrated in any of the above-described block diagrams. Then, the CPU 102 causes a processing result to be output from an output unit 106, transmitted from a communication unit 108, or recorded on the hard disk 105 via the input/output interface 110 if necessary.

The input unit 107 includes a keyboard, a mouse, a microphone, and the like. The output unit 106 includes a liquid crystal display (LCD), a speaker, and the like.

In this specification, the processes performed by the computer in accordance with a program are not necessarily performed in time series in accordance with the order described as a flowchart. That is, the processes performed by the computer in accordance with a program may be performed in parallel or individually (for example, a parallel process or a process by an object).

The program may be executed by a single computer (processor) or may be processed by a plurality of computers in a distributed manner. Furthermore, the program may be transferred to a remote computer to be executed.

In this specification, a system means a set of a plurality of elements (apparatuses, modules, components, or the like), and all the elements are not necessarily accommodated in the same casing. Thus, a plurality of apparatuses which are accommodated in different casings and which are connected to one another via a network, and a single apparatus in which a plurality of modules are accommodated in a single casing are regarded as a system.

The embodiment of the present technology is not limited to the above-described embodiment, and various modifications can be made without deviating from the gist of the present technology.

For example, according to the present technology, a configuration of cloud computing can be employed in which a single function may be shared by a plurality of apparatuses via a network and may be processed in cooperation with one another.

The individual steps of the above-described flowcharts may be executed by a single apparatus, or may be executed by a plurality of apparatuses in a distributed manner.

Furthermore, in a case where a single step includes a plurality of processes, the plurality of processes may be executed by a single apparatus, or may be executed by a plurality of apparatuses in a distributed manner.

The present technology may provide the following configurations.

(1) A method for controlling power supplied to a load of a wireless power reception apparatus, the method comprising: receiving, wirelessly at a power reception coil of the power reception apparatus, power from a power transmission apparatus;

determining, by the power reception apparatus and according to a first detection method, whether foreign matter that adversely affects wireless power transmission is present between the wireless power transmission apparatus and the power reception apparatus, wherein the determining is executed before applying power from the power reception coil to the load; and analyzing, by the power reception apparatus according to a second detection method different from the first detection method and while power is applied to the load, power transmission between the wireless power transmission apparatus and the power reception apparatus.

(2) The method of claim 1, wherein the determining comprises measuring, by the power reception apparatus, a Q value of the power reception coil.

(3) The method of (1), wherein the determining comprises measuring, by the power reception apparatus, an effective resistance value of the power reception coil.

(4) The method of (1), wherein the determining comprises receiving or not receiving, by the power reception apparatus, an optical communication from the power transmission apparatus.

(5) The method of (1), wherein the determining comprises processing, by the power reception apparatus, an image of a region between the power transmission apparatus and the power reception apparatus.

(6) The method of (1), wherein the analyzing comprises:
receiving, by the power reception apparatus, an indication of an amount of power transmitted by the power transmission apparatus; and calculating, by the power reception apparatus, a ratio of power received by the power reception apparatus to the amount of power transmitted by the power transmission apparatus.

(7) The method of (1), wherein the analyzing comprises measuring, by the power reception apparatus, a temperature near the power reception coil.

(8) The method of (1), further comprising transmitting, by the
power reception apparatus and responsive to determining foreign matter that adversely affects wireless power transmission is present, a stop signal to the power transmission apparatus to indicate stopping the wireless power transmission.

(9) The method of (8), further comprising providing a
notification to a user of the power reception apparatus that an abnormal power transmission condition is present.

(10) A power reception apparatus configured to receive power wirelessly from a power transmission apparatus, the power reception apparatus comprising:
a power reception coil;
a load;
a controller configured to control power supplied from the power reception coil to the load; and
a foreign matter detector, wherein the power reception apparatus is configured to:
determine, prior to applying power from the power reception coil to the load and according to a first detection method, whether foreign matter that adversely affects wireless power transmission is present between the power transmission apparatus and the power reception apparatus; and
analyze, according to a second detection method different from the first detection method and while power is applied to the load, power transmission between the wireless power transmission apparatus and the power reception apparatus.

(11) The power reception apparatus of (10), wherein the
power reception apparatus is arranged to supply power used to operate an electric vehicle.

(12) The power reception apparatus of (10), wherein the
power reception apparatus is arranged to supply power used to operate a home electronic appliance or a mobile phone.

(13) The power reception apparatus of (10), wherein
the configuration to determine comprises a configuration to measure, by the power reception apparatus, a Q value of the power reception coil; and
the configuration to analyze comprises a configuration to receive, by the power reception apparatus, an indication of an amount of power transmitted by the power transmission apparatus, and calculate, by the power reception apparatus, a ratio of power received by the power reception apparatus to the amount of power transmitted by the power transmission apparatus.

(14) The power reception apparatus of claim 10, wherein the
configuration to determine comprises a configuration to measure, by the power reception apparatus, an effective resistance value of the power reception coil.

(15) The power reception apparatus of (10), wherein the
configuration to analyze comprises a configuration to measure, by the power reception apparatus, a temperature near the power reception coil.

(16) The power reception apparatus of (10), further
comprising a resistor configured to be switched across two terminals of the power reception coil so as to transmit a signal to the power transmission device.

(17) A manufactured storage device having machine-readable
instructions that, when executed by at least one processor that is configured to control power supplied from a power reception coil to a load in a power reception apparatus, cause the at least one processor to:
determine, according to a first detection method and
before applying power from the power reception coil to the load, whether foreign matter that adversely affects wireless power transmission is present between a wireless power transmission apparatus and the power reception apparatus; and
analyze, according to a second detection method different from the first detection method and while power is applied to the load, power transmission between the wireless power transmission apparatus and the power reception apparatus.

(18) The manufactured storage device of (17), wherein the
instructions that cause the at least one processor to determine comprise instructions for measuring a Q value of the reception coil.

(19) The manufactured storage device of (17), wherein the
instructions that cause the at least one processor to determine comprise instructions for measuring an effective resistance of the reception coil.

(20) The manufactured storage device of (17), wherein the
instructions that cause the at least one processor to analyze comprise instructions for determining a ratio of an amount of power received by the power reception apparatus to power transmitted by the power transmission apparatus.

(21) A processing device including:
a detector configured to detect foreign matter
by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and
by determining whether or not foreign matter exists by using a second detection method, which is different from the first detection method, while power is being supplied to the load.

(22) The processing device according to (21),
wherein the second detection method is a method for determining whether or not foreign matter exists by measuring a certain physical amount and performing a threshold process of comparing a measured value of the certain physical amount with a certain threshold, and
wherein the detector decides the certain threshold to be used in the threshold process after determining that no foreign matter exists by using the first detection method.

(23) The processing device according to (22),
wherein the detector calculates the certain threshold to be used in the threshold process by using the measured value which is obtained immediately after the detector determines that no foreign matter exists by using the first detection method.

(24) The processing device according to (23),
wherein the detector performs, as a process of determining whether or not foreign matter exists by using the second detection method,
a first threshold process in which a predetermined threshold is used, and a second threshold process in which a threshold is used, the threshold being calculated by using the measured value which is obtained immediately after the detector determines that no foreign matter exists by using the first detection method, the second threshold process being performed if the detector determines that no foreign matter exists in the first threshold process.

(25) The processing device according to (24), wherein, if the detector determines that foreign matter exists in the second threshold process, the detector determines again whether or not foreign matter exists by using the first detection method.

(26) The processing device according to (25), further including:
a power supply controller configured to stop power supply to the load if foreign matter is detected.

(27) The processing device according to (26), wherein the power supply controller stops power supply to the load if the detector determines that foreign matter exists by using the first detection method and if the detector determines that foreign matter exists by using the first threshold process.

(28) The processing device according to any of (21) to (27), wherein the first detection method is a method for detecting whether or not foreign matter exists with higher accuracy than the second detection method.

(29) The processing device according to any of (21) to (27), wherein the second detection method is a method which enables detection of foreign matter even while power is being supplied to the load.

(30) The processing device according to any of (21) to (29), wherein the power reception apparatus includes a power reception coil, which is a coil for receiving power from the power transmission apparatus, and wherein the first detection method is a method for determining whether or not foreign matter exists by using a Q-value of the power reception coil or an effective resistance value.

(31) The processing device according to any of (21) to (29), wherein the first detection method is a method for determining whether or not foreign matter exists by determining whether or not optical communication is possible between the power transmission apparatus and the power reception apparatus or by using an image of a portion between the power transmission apparatus and the power reception apparatus.

(32) The processing device according to any of (21) to (31), wherein the second detection method is a method for determining whether or not foreign matter exists by performing a threshold process on a change in power efficiency representing a ratio of power received by the power reception apparatus to power transmitted by the power transmission apparatus, a change in temperature between the power transmission apparatus and the power reception apparatus, or a change in load of the power reception apparatus viewed from the power transmission apparatus.

(33) A processing method including:
detecting foreign matter
by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and
by determining whether or not foreign matter exists by using a second detection method, which is different from the first detection method, while power is being supplied to the load.

(34) A program causing a computer to function as:
a detector configured to detect foreign matter
by determining, in a power reception apparatus which receives power through wireless power supply from a power transmission apparatus which transmits power, whether or not foreign matter which affects the wireless power supply exists by using a first detection method, before power supply to a load of power using the wireless power supply is started, and
by determining whether or not foreign matter exists by using a second detection method, which is different from the first detection method, while power is being supplied to the load.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 power transmission apparatus
12 power reception apparatus
20 resonance circuit
21 DC power source
22 driver circuit
23 waveform detector
24 controller
31 gate drive circuit
32 to 35 FET
40 resonance circuit
41 rectifier
42 communication unit
43 regulator
44 load
45 controller
46 foreign matter detector
51 Q-value measuring unit
52 efficiency measuring unit
53 determining unit
62 temperature measuring unit
71, 81 communication unit
82 communication antenna
101 bus
102 CPU
103 ROM
104 RAM
105 hard disk
106 output unit
107 input unit
108 communication unit
109 drive
110 input/output interface
111 removable recording medium

The invention claimed is:
1. A power transmitting device comprising:
quality factor measuring circuitry configured to electronically calculate a quality factor of a resonance circuit, a first foreign object detection method is a method that detects a presence of a foreign object or an absence of the foreign object by electronically comparing a first threshold with the quality factor calculated by the quality factor measuring circuitry;

efficiency measuring circuitry configured to electronically calculate a power loss based on an amount of power transmitted by the power transmitting device during a wireless power transfer and an amount of the power received by a power receiving device, a second foreign object detection method is a method that detects the presence of the foreign object or the absence of the foreign object by electronically comparing a second threshold with the power loss calculated by the efficiency measuring circuitry; and foreign object detection circuitry configured to perform the first foreign object detection method prior to the wireless power transfer and to perform the second foreign object detection method during the wireless power transfer, the power transmitting device is configured to receive the first threshold prior to the wireless power transfer and to transmit the power wirelessly to the power receiving device during the wireless power transfer.

2. The power transmitting device according to claim 1, wherein the power loss indicates an amount of the power that has been lost during the wireless power transfer.

3. The power transmitting device according to claim 1, wherein the power transmitting device is configured to perform an initial power transfer to the power receiving device before performing the first foreign object detection method.

4. The power transmitting device according to claim 1, wherein the foreign object detection circuitry is configured to perform the second foreign object detection method while the power receiving device is providing power to a load.

5. The power transmitting device according to claim 1, wherein the power transmitting device is configured to perform the wireless power transfer based on a result of the first foreign object detection method.

6. The power transmitting device according to claim 1, wherein the power transmitting device is configured to perform the wireless power transfer to the power device when the quality factor is not less than the first threshold.

7. The power transmitting device according to claim 1, wherein the power transmitting device is configured to control the wireless power transfer based on a result of the second foreign object detection method.

8. The power transmitting device according to claim 1, wherein the power transmitting device is configured to terminate the wireless power transfer based on a result of the second foreign object detection method.

9. The power transmitting device according to claim 1, wherein the power transmitting device is configured to terminate the wireless power transfer when the power loss is not higher than the second threshold.

10. A wireless power transfer system comprising:
a power receiving device configured to output a first threshold before a wireless power transfer; and
a power transmitting device configured to receive the first threshold from the power receiving device prior to the wireless power transfer and to transmit power wirelessly to the power receiving device during the wireless power transfer,
wherein the power transmitting device includes:
quality factor measuring circuitry configured to electronically calculate the quality factor of a resonance circuit,
efficiency measuring circuitry configured to electronically calculate a power loss based on an amount of power transmitted by the power transmitting device during the wireless power transfer and an amount of the power received by the power receiving device, and
foreign object detection circuitry configured to perform a first foreign object detection method prior to the wireless power transfer and to perform a second foreign object detection method during the wireless power transfer,
wherein the first foreign object detection method is a method that detects a presence of a foreign object or an absence of the foreign object by electronically comparing the first threshold with the quality factor calculated by the quality factor measuring circuitry, and
wherein the second foreign object detection method is a method that detects the presence of the foreign object or the absence of the foreign object by electronically comparing a second threshold with the power loss calculated by the efficiency measuring circuitry.

11. The wireless power transfer system according to claim 10, wherein the power loss indicates an amount of the power that has been lost during the wireless power transfer.

12. The wireless power transfer system according to claim 10, wherein the power receiving device is configured to provide a reference value to determine the first threshold.

13. The wireless power transfer system according to claim 10, wherein the power receiving device is configured to provide the first threshold.

14. The wireless power transfer system according to claim 10, wherein the transmitting device is configured to terminate the wireless power transfer when the calculated power loss during the wireless power transfer is not higher than the second threshold.

15. The wireless power transfer system according to claim 10, wherein the power transmitting device is configured to perform the wireless power transfer based on a result of the first foreign object detection method.

16. The wireless power transfer system according to claim 10, wherein the power transmitting device is configured to control the wireless power transfer based on a result of the second foreign object detection method.

17. A method of transmitting power, the method comprising:
outputting a first threshold from a power receiving device prior to a wireless power transfer;
receiving the first threshold from the power receiving device by a power transmitting device prior to the wireless power transfer;
electronically calculating the quality factor of a resonance circuit using quality factor measuring circuitry in the power transmitting device;
performing a first foreign object detection method prior to the wireless power transfer using foreign object detection circuitry in the power transmitting device;
transmitting power wirelessly from the power transmitting device to the power receiving device during the wireless power transfer;
electronically calculating a power loss based on an amount of power transmitted by the power transmitting device during the wireless power transfer and an amount of the power received by the power receiving device using efficiency measuring circuitry in the power transmitting device; and performing a second foreign object detection method during the wireless power transfer using the foreign object detection circuitry, wherein the first foreign object detection method is a method that detects a presence of a foreign object or an absence of the foreign object by electronically comparing the first threshold with the quality factor calculated by the quality factor measuring circuitry, and wherein the second foreign object detection method is a method that detects the presence of the foreign object or the absence of the foreign object by electronically comparing a second threshold with the power loss calculated by the efficiency measuring circuitry.

18. The method according to claim 17, wherein the power loss indicates an amount of the power that has been lost during the wireless power transfer.

19. The method according to claim 17, further comprising:

performing an initial transfer of the power to the power receiving device prior to performing the first foreign object detection method by the power transmitting device.

20. The method according to claim 17, wherein the second foreign object detection method is performed while the power receiving device is providing power to a load.

21. The method according to claim 17, wherein the power transmitting device performs the wireless power transfer based on a result of the first foreign object detection method.

22. The method according to claim 17, wherein the power transmitting device performs the wireless power transfer to the power device when the quality factor is not less than the first threshold.

23. The method according to claim 17, further comprising:

controlling the wireless power transfer based on a result of the second foreign object detection method by the power transmitting device.

24. The method according to claim 17, further comprising:

terminating the wireless power transfer based on a result of the second foreign object detection method by the power transmitting device.

25. The method according to claim 17, further comprising:

terminating the wireless power transfer when the power loss is not higher than the second threshold by power transmitting device.

* * * * *